US009672532B2

(12) United States Patent
Kirkeby

(10) Patent No.: US 9,672,532 B2
(45) Date of Patent: Jun. 6, 2017

(54) MONETIZING DOWNLOADABLE FILES BASED ON RESOLVING CUSTODIANSHIP THEREOF TO REFERRING PUBLISHER AND PRESENTATION OF MONETIZED CONTENT IN A MODAL OVERLAY CONTEMPORANEOUSLY WITH DOWNLOAD

(71) Applicant: Cynthia Fascenelli Kirkeby, Orange, CA (US)

(72) Inventor: Cynthia Fascenelli Kirkeby, Orange, CA (US)

( * ) Notice: Subject to any disclaimer, the term of this patent is extended or adjusted under 35 U.S.C. 154(b) by 0 days.

(21) Appl. No.: 15/243,350

(22) Filed: Aug. 22, 2016

(65) Prior Publication Data

US 2016/0358217 A1    Dec. 8, 2016

Related U.S. Application Data

(63) Continuation of application No. 14/318,109, filed on Jun. 27, 2014, now Pat. No. 9,451,011.

(60) Provisional application No. 61/841,740, filed on Jul. 1, 2013.

(51) Int. Cl.
| | | |
|---|---|---|
| *G06F 17/00* | (2006.01) | |
| *H04L 29/06* | (2006.01) | |
| *G06Q 30/02* | (2012.01) | |
| *H04L 29/08* | (2006.01) | |
| *G06F 21/10* | (2013.01) | |

(Continued)

(52) U.S. Cl.
CPC ......... *G06Q 30/0263* (2013.01); *G06F 21/10* (2013.01); *G06Q 20/123* (2013.01); *G06Q 30/00* (2013.01); *H04L 63/08* (2013.01); *H04L 63/10* (2013.01); *H04L 63/20* (2013.01); *H04L 67/06* (2013.01)

(58) Field of Classification Search
CPC ............................ G06Q 30/0263; G06F 21/10
USPC .............................................................. 726/1
See application file for complete search history.

(56) References Cited

U.S. PATENT DOCUMENTS

| | | |
|---|---|---|
| 6,466,967 B2 | 10/2002 | Landsman et al. |
| 7,325,058 B1 | 1/2008 | Sheth et al. |
| 7,353,229 B2 | 4/2008 | Vilcauskas, Jr. et al. |

(Continued)

OTHER PUBLICATIONS

PCT Notification of transmittal of the International Search Report and the Written Opinion of the International Searching Authority, PCT/US2014/044941, Jan. 26, 2015.

(Continued)

*Primary Examiner* — Dant Shaifer Harriman
(74) *Attorney, Agent, or Firm* — One3 IP Management, P.C.; Justin G. Sanders; Peter D. Weinstein

(57) ABSTRACT

The monetization of downloadable files associated with a custodial host site based on resolving custodianship to a referrer publisher with subsequent presentation of monetized content within a modal overlay is disclosed. A request from a client device has a resource identifier and a referrer publisher identifier. The request for the downloadable file is evaluated against one or more publisher and custodianship policy rules, which relate to a file extension of the downloadable file, a format of the resource identifier, a custodial domain on which the downloadable file is stored, and a referral domain as specified in the referrer publisher identifier. When custodianship is resolved, a modal overlay on which monetized content is incorporated is presented on the client device. The modal overlay is concurrently displayed with the transfer of the downloadable file to the client device.

20 Claims, 16 Drawing Sheets

(51) Int. Cl.
  *G06Q 30/00* (2012.01)
  *G06Q 20/12* (2012.01)

(56) References Cited

U.S. PATENT DOCUMENTS

| | | | |
|---|---|---|---|
| 7,822,637 | B2 | 10/2010 | Shkedi |
| 7,886,067 | B2 | 2/2011 | Krassner et al. |
| RE42,548 | E | 7/2011 | Kuriyama |
| 8,150,727 | B2 | 4/2012 | McCourt |
| 8,165,915 | B1 | 4/2012 | Lucash |
| 2001/0049824 | A1 | 12/2001 | Baker et al. |
| 2001/0051925 | A1 | 12/2001 | Kang |
| 2002/0010760 | A1 | 1/2002 | Armenta et al. |
| 2002/0111910 | A1 | 8/2002 | Walsh |
| 2002/0124009 | A1 | 9/2002 | Hoblit |
| 2003/0028565 | A1 | 2/2003 | Landsman et al. |
| 2004/0078809 | A1 | 4/2004 | Drazin |
| 2006/0020506 | A1 | 1/2006 | Axe et al. |
| 2007/0050245 | A1 | 3/2007 | Humphries, IV et al. |
| 2007/0198660 | A1 | 8/2007 | Cohen |
| 2007/0201502 | A1 | 8/2007 | Abramson |
| 2008/0201186 | A1 | 8/2008 | Poon et al. |
| 2008/0201464 | A1 | 8/2008 | Campbell et al. |
| 2008/0255686 | A1 | 10/2008 | Irvin et al. |
| 2009/0199013 | A1 | 8/2009 | Raciborski |
| 2009/0234730 | A1 | 9/2009 | Lee |
| 2010/0011090 | A1 | 1/2010 | Gordon |
| 2010/0057884 | A1 | 3/2010 | Brownell et al. |
| 2010/0082641 | A1 | 4/2010 | Rinckes et al. |
| 2010/0153217 | A1 | 6/2010 | Kirkby et al. |
| 2010/0191609 | A1 | 7/2010 | Hodgettes et al. |
| 2010/0293054 | A1 | 11/2010 | Lieberman |
| 2011/0239103 | A1 | 9/2011 | Mercuri |
| 2012/0173506 | A1 | 7/2012 | Wilansky et al. |
| 2013/0030916 | A1 | 1/2013 | Skalet et al. |
| 2013/0138487 | A1 | 5/2013 | Crasmaru et al. |

OTHER PUBLICATIONS

Rose, Daniel E. et al., Understanding User Goals in Web Search, May 17-22, pp. 13-19, New York.

| 38 | PUBLISHER DOMAINS |
|---|---|
| | CLASSBRAIN.COM |
| | CLASSBRAIN.NET |
| | CLASSBRAINGAMES.COM |
| | CLASSBRAINMATH.COM |
| | CLASSBRAINMISSIONS.COM |

ACCOUNT – ADMINISTRATIVE SETTINGS

ACCOUNT

| NAME | Classbrain, Inc. |
|---|---|
| ADDRESS | 1234 Main Street |
| CITY | Any Town |
| STATE | CA |
| ZIP CODE | 90000 |
| COUNTRY | UNITED STATES |
| LANGUAGE | English |
| CURRENCY | USD US Dollar |
| ACTIVATION DATE | 10-Nov-2013 |
| PHONE | 555-555-5555 |
| FAX | 555-555-5555 |

EDIT

SELECT WEB SITE ClassBrain

| 46a | NAME | ClassBrain |
|---|---|---|
| 46b | PUB. ID | Cb124438-0001 |
| 46c | SITE ID | Cb124438-0001-ab0001 |
| 46d | STATUS | Authenticated |
| 46e | URL | Http://www.classbrain.com |
| 46f | DESCRIPTION | ClassBrain is an educational site for parents, students, and teachers from kindergarten to college. |

FILE TYPES  ☐ .pdf  ☐ .doc  ☐ .docx  ☐ .mov  ☐ .psd

GENERATE SITE CODE

EDIT    ADD A NEW SITE

FIG. 6A

| | |
|---|---|
| SELECT WEB SITE | ClassBrainGames.com ▼ |

44—

| | |
|---|---|
| NAME | ClassBrain |
| PUB. ID | Cb124438-0001 |
| SITE ID | Cb124438-0001-ab0002 |
| STATUS | Authenticated |
| URL | Http://www.classbraingames.com |
| DESCRIPTION | ClassBrainGames.com is one of the largest educational game sites with games to help you learn math, art, vocabulary, languages, logic, strategy, business, ecology and more with... |
| FILE TYPES | ☐ .pdf  ☐ .doc  ☐ .docx  ☐ .mov  ☐ .psd |

GENERATE SITE CODE

EDIT    ADD A NEW SITE

FIG. 6B

MONETIZATION AGENCY BRANDING    PUBLISHER ID    PUBLISHER EMAIL    SIGN OUT

| HOME | REPORTS | MY ADS | PREFERENCES | HELP |

REGISTERED WEBSITES

⊕ ⊖ WEBSITE #1  http://classbrain.com          VERIFIED          AAID:349992A58082013001
⊕ ⊖ WEBSITE #2  http://classbraingames.com     VERIFIED          AAID: 349992A58082013002
⊕ ⊖ WEBSITE #3  http://classbrainmath.com      NOT YET VERIFIED  N/A
⊕ ⊖ WEBSITE #4  http://classbrainmissions.com  VERIFIED          AAID:349992A58082013003
⊕ ⊖ WEBSITE #5  http://creativecranium.com     VERIFIED          AAID:349992A58082013003

| AD TYPE       | DISPLAY AD WITH OPTION TO SEARCH | SERVE FILE TO UNAFFILIATED SITES | YES |
| FONT FAMILY   | VERDADANA, SANS SERIF            | SERVE FILE TO AD BLOCKED USERS   | NO |
| COLOR PALETTE | DEFAULT (BLUE)                   | MESSAGE FOR AD BLOCKED USERS     | THIS DOCUMENT IS PROTECTED |
| NEWSFEED      | YES                              |                                  |     |
| BRANDING      |                                  |                                  |     |

| MY ADS | GENERAL AD CATEGORIES | BLOCKED ADS | SENSITIVE AD CATEGORIES |

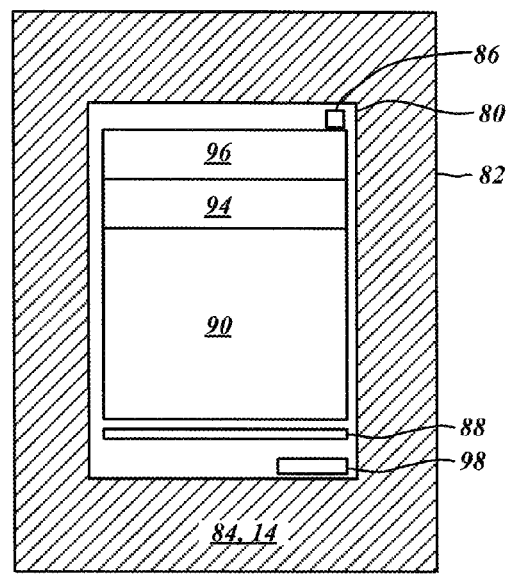
FIG. 13A
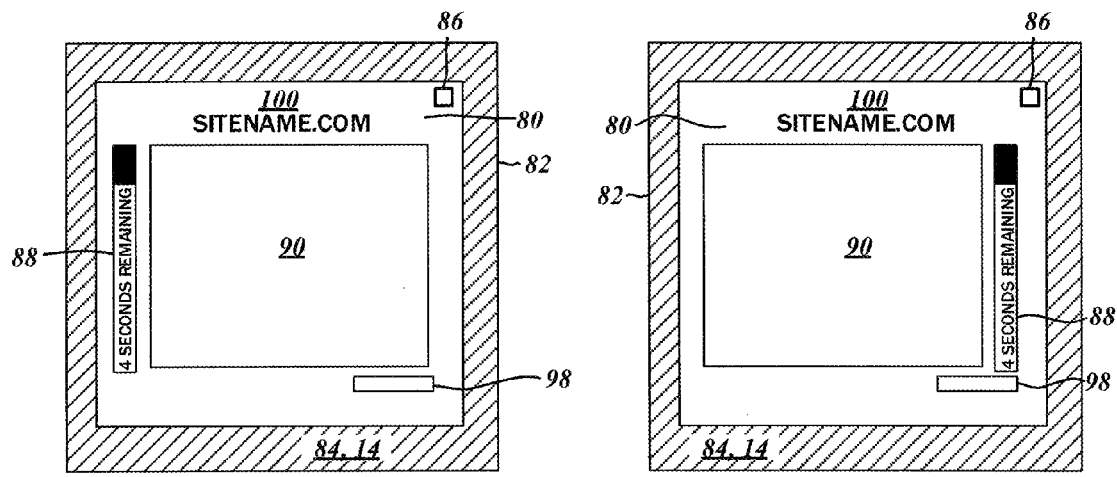
FIG. 13B  FIG. 13C

MONETIZING DOWNLOADABLE FILES BASED ON RESOLVING CUSTODIANSHIP THEREOF TO REFERRING PUBLISHER AND PRESENTATION OF MONETIZED CONTENT IN A MODAL OVERLAY CONTEMPORANEOUSLY WITH DOWNLOAD

RELATED APPLICATIONS

This is a continuation application and so claims the benefit pursuant to 35 U.S.C. §120 of a prior filed and U.S. Non-Provisional patent application Ser. No. 14/318,109, filed on Jun. 27, 2014, which itself claims priority pursuant to 35 U.S.C. §119(e) to and is entitled to the filing date of U.S. Provisional Patent Application Ser. No. 61/841,740, filed on Jul. 1, 2013. The contents of the aforementioned application(s) is/are incorporated herein by reference.

BACKGROUND

The present disclosure relates to network-based data transfers, and more particularly, to Internet-based content delivery and monetization over the open Web environment as well as closed proprietary systems to expand opportunities for custodial publishers to receive revenue associated with downloadable digital content.

Applicant(s) hereby incorporate herein by reference any and all patents and published patent applications cited or referred to in this application.

Traditionally, advertisements have been the means by which publishers monetized digital assets. These advertisements are embedded on web pages, and presented in visual proximity to various written and/or visual materials such as articles, videos, and the like. The presentation of advertisements has evolved over time, with the earliest examples being standard HTML compatible code embedded within page content as text or images. More recently, more engaging presentations are utilized, such as pop-up/pop-under advertisements, also referred to as superstitials, interstitials in which the user is redirected to an intermediary webpage between two other webpages and an advertisement is presented for a predefined time, until user action is received in order to transition to the content, and dynamic advertisements that expand across a page when a user interacts with an embedded webpage advertisement. Web pages, however, represent merely a fraction of the digital assets available from publishers today, and conventional advertisements are a small portion of the monetized content now available from advertisers. Monetized content may refer to advertisements (including video), affiliate merchant products, monetized search widgets, advertorial blurbs, promoted social media content such as "Pins, Tweets, and Posts," art, music, and photography, etc.

Considering that the systems that handle publisher content on the Internet, There are two types of content systems on the Internet in very simplified terms: closed and open. A closed system is one in which a group of web pages and/or files are locked in a proprietary system or framework and are therefore inaccessible to the public without payment and/or a password. An example of such a closed system is a pay-per-download framework. The file is inaccessible to the general public and only becomes accessible once payment is made, a custom URL accessed, and/or a password is provided by the user to retrieve the file. Certain closed systems, such as YouTube, have limited attributes of an open system, where the files (in this case videos) are accessible to the public for viewing, but the files themselves are inaccessible to the public for download. An open system, on the other hand, represents the remainder and the majority of the Internet, where web pages and/or files may be easily linked to by websites around the world, and readily accessed by the public at large without any restrictions. Unlike closed systems, no payment or passwords are required to access web pages or files that reside within the open web environment.

By some estimates, there are billions of downloadable files posted on the Internet that are freely available. These include PDF (Portable Document Format) documents, as well as others in native editable document formats such as .doc/.docx files for word processing documents editable in, for example, Microsoft Word, .ppt files for presentation documents editable in, for example, Microsoft Powerpoint, .xls files for spreadsheet documents editable in, for example, Microsoft Excel, .ai files for raster graphics editable in Adobe Illustrator, and so forth. Other data such as fonts (.ttf), mobile applications (.app), plugins, executable applications (.exe), etc. are additional examples of downloadable files that are available on the Internet. One search engine returned 1.19 billion "activity PDF" files, alone [indexed in 0.22 seconds, May 2014], representing hundreds of billions, or possibly trillions of download instances each year. Thus, there is a substantial volume of under-monetized assets. With the advent of tablets, smart phones, wearable computing devices, and more intelligent gaming systems, the number of daily downloaded files has increased exponentially. According to Apple, over five million e-books were downloaded during the first 65 days that the Apple iBook store was open, many of which were downloaded for free, and 2.5 million application installations accounted for and 10 billion downloads in the first six months of 2013. Although network bandwidth and data transfer rates are increasing, the demand for such improved network capacity has commensurately increased. Even with a 768 Kbps DSL (Digital Subscriber Line) connection, which is an average broadband home connection in the United States, an average music file of about 7 megabytes takes about one minute and 16.46 seconds to download.

New forms of monetizing publishing assets are being developed, but most approach the problem through the aforementioned closed systems. One of the challenges of an open web environment is the determination of custodianship of a particular file, so that only those with a legitimate monetization right can do so. Free linking is a fundamental aspect of the form and function of the open architecture of the Internet, and this essential function is also one of its greatest strengths. That a single file can have multiple incoming links, oftentimes in the thousands or tens of thousands, can also be the most significant weakness with respect to monetizing digital files. Copyright laws can protect, to a certain extent, the creator/author's ability to exercise control over their dissemination (and hence profit) from their works. In an open web environment, any third party can link directly to any file that is accessible via the Web, however, ascertaining whether a particular link originator is entitled to monetization is difficult. Closed, protective systems provide a partial solution by preventing unauthorized linking to these files, but they also eliminate the benefit that would be derived from those same incoming links.

Deep-linking is the practice of linking to an interior webpage instead of the homepage of the site without requiring navigation through what can be complex layers of a website. The more invasive practice of hot-linking is the practice of linking directly to a file on a site, instead of the hosting publisher's webpage that links to the file, thus bringing users directly to those resources. Hot-linking to files can be malicious, since it may be used to illegally display or access a file directly from a site that is out of the control of the publisher, thereby intentionally bypassing associated monetization pages. In the case of video, it may be used to illegally display the video, bypass any associated advertising, and effectively misappropriate the bandwidth of the site. Access to the content outside the terms service, that is, access without first viewing the advertising, may rise to an infringement of the provider's property rights.

Again, one of the most significant strengths of the open environment of the Web is that individuals and entities can link directly to materials around the world. Thus, there may be certain incidental benefits of hot-linking to a downloadable file that help a publisher or site owner. For instance, sets of inbound links can increase the publisher's rank within an Internet search system. The challenge is in retaining the benefits, while eliminating the detrimental aspects of hot-linking.

Because Internet commerce has been largely content-driven in its short history, the ability to open this immense pool of publishers' assets to monetization by advertisers and merchants would represent a significant revenue enhancement to all stakeholders. Accordingly, there is a need in the art to associate monetized content to publishers' downloadable assets. This need for the monetization of downloadable files exists in the open web environment where custodianship of the downloadable content has been determined, as well as in closed systems where it would function as an alternative to currently available methods.

As mentioned above, monetization of conventional web page content has been achieved with advertising, which is generally limited to web page views and click-through interactions, web page to web page intermediary redirect advertisements, embedded proprietary video advertisements, and so on. With the distinctive needs related to the monetization of downloadable files, there is also a need in the art for an effective presentation of the same. Thus, it would be desirable for a specialized monetization modality to accommodate the monetized content related to navigation to specific downloadable files Aspects of the present invention fulfill these needs and provide further related advantages as described in the following summary.

SUMMARY

Aspects of the present invention teach certain benefits in construction and use which give rise to the exemplary advantages described below.

The present disclosure is directed to the monetization of downloadable files based on resolving custodianship between a publisher and a file host with policy-based rule sets, scripts, and identifiers. Various technical improvements to inserting monetization content into data transmissions in an open Web environment are also disclosed. A publisher can thus attach monetized content as defined herein to specified files without complicated access restriction modalities. Once custodianship is identified, the assets can be correctly monetized through advertising and publishing. Accordingly, content creators can maintain monetization control over their works.

In one embodiment, a method for resolving custodianship of a downloadable file is disclosed. The downloadable file may be stored on a custodial host site and referenced by a resource identifier. The request may originate from a client device. The method may include receiving the request for the downloadable file generated from the client device through the custodial host site. The request may include the resource identifier and a referrer publisher identifier that specifies an origin from which the request for the downloadable file was generated. The method may also include evaluating the request for the downloadable file against one or more custodianship policy rules. Each of these custodianship policy rules may be defined by a custodianship parameter related to a part of at least one of the resource identifier and the referrer publisher identifier and a criterion value that corresponds to a positive evaluation of custodianship. There may further be a step of designating the request for the downloadable file as having the positive evaluation of custodianship in response to parts of at least one of the resource identifier and the referrer publisher identifier matching criterion values for at least two particular ones of the custodianship policy rules. The custodianship parameter of one of the custodianship policy rules may be one of: a file extension of the downloadable file as specified in the resource identifier, a format of the resource identifier, a custodial domain on which the downloadable file is stored as specified in the resource identifier, and a referral domain as specified in the referrer publisher identifier. This policy-based system allows custodianship criteria to be highly flexible and responsive.

Another embodiment is a method for monetizing a downloadable file stored on a custodial host site and requested by a client device. There may be a step of receiving a request for the downloadable file from the client device, the request including a resource identifier and a referrer publisher identifier specifying an origin from which the request for the downloadable file was generated. Furthermore, there may be a step of setting a file type authorization for the request based upon an evaluation of a file extension of the downloadable file being included in an array of authorized file types. There may also be a step of setting a publisher custodianship for the request based at least in part upon an evaluation of the resource identifier in the request. The method may continue with transmitting a modal overlay display instruction to the client device with the file type authorization and the publisher custodianship for the request being established. There may further be a step of directing a transmission of the monetized content to the client device for display thereon in a modal overlay being generated in response to the modal overlay display instruction. The method may include directing a transmission of the downloadable file specified in the request to the client device concurrently with the transmission of the modal overlay display instruction.

Yet another embodiment contemplates a method for presenting monetized content for a downloadable file stored on a custodial host site and referenced by a resource identifier. The method may include rendering on the client device a first view of a referral page received from a publisher site. The referral page may include the resource identifier for the downloadable file. There may be a step of receiving a load triggering event corresponding to a request for the downloadable file from a user on the client device. Furthermore, the method may include transmitting the request for the downloadable file to the custodial host site. The request may also include the resource identifier. There may also be a step of rendering a modal overlay over the referral page following a validation of custodianship of the downloadable file by the referral page. Thereafter, there may be a step of initiating a transfer instance of the downloadable file from the custodial host site at a time that is one of concurrent with the rendering of the modal overlay and subsequent to the rendering of the modal overlay, data of the downloadable file being received on the client device from the custodial host site during the transfer instance. The method may also include updating a download progress indicator within the modal overlay during the transfer instance, and then closing the modal overlay in response to a modal overlay termination event. The modal overlay termination event may be one of a user input closure activity and a monetization system-generated termination event.

Still another embodiment of the present disclosure contemplates a method for monetizing a downloadable file being accessed by a client device. The method may include deriving an extension type of the downloadable file. Additionally, the method may include a step of validating an authorization to monetize the downloadable file according to one or more rules as set by at least one of a custodial publisher and a monetization system. One of the rules may relate to a file extension. There may be a step of applying one or more characteristics associated with the downloadable file including one or more presentation characteristics of monetized content within a modal overlay presentable on the client device. Furthermore, there may be a step of applying one or more characteristics associated with the one or more rules including one or more presentation characteristics of monetized content within the modal overlay presentable on the client device. The method may additionally include a step of customizing one or more forms of monetized content based on the identified characteristics associated with the downloadable file and on the identified characteristics associated with the one or more rules by customizing a presentation of monetized content based on the one or more identified presentation characteristics of the content within the modal overlay. The method may also include transmitting the customized monetized content for display in the modal overlay.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIGS. 6A and 6B are screen captures of exemplary configuration panels for a monetization system including an account setup section and a site configuration section in FIG. 6A showing options for a first publisher site and a site configuration section in FIG. 6B showing options for a second publisher site, in accordance with at least one embodiment;

FIG. 7 is a screen capture of the exemplary dashboard panel for the monetization system, in accordance with at least one embodiment;

FIGS. 13A-13E depict layouts of various exemplary modal overlays in accordance with the embodiments of the present disclosure.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

The detailed description set forth below in connection with the appended drawings is intended as a description of certain embodiments of monetizing downloadable files based on resolving custodianship thereof to a referring publisher, and presenting monetized content in a modal overlay contemporaneously with the download. It is not intended to represent the only forms of these methods that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Figure 1:
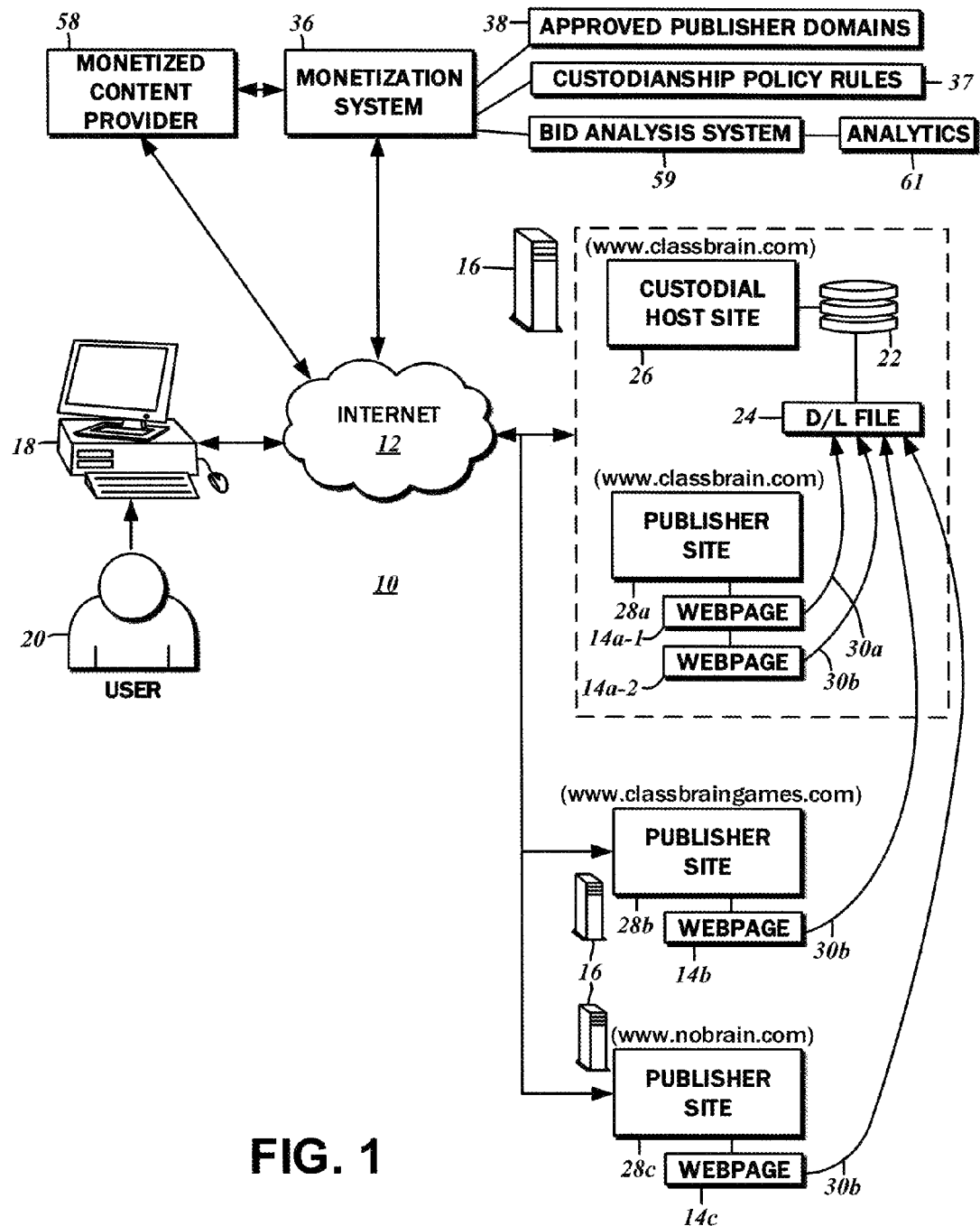
FIG. 1 is a block diagram illustrating an exemplary environment in which various embodiments of the present disclosure may be implemented, in accordance with at least one embodiment.

The block diagram of FIG. 1 illustrates a networked computing environment 10 in which various embodiments of the present disclosure may be implemented. By way of example, the environment 10 is the open Web, where various computer systems communicate with each other to exchange information over a common network modality, e.g., the Internet 12. The Web, in general terms, may be comprised of numerous hyperlinked documents 14, also referred to as webpages, stored on various server computer systems 16 and served to client devices 18 upon request. Reference to webpages in the present disclosure, however, is not intended to be limiting and could also encompass other interactive media connected to the Internet, including interactive flipbooks and media, as well as documents, videos, apps, and games with embedded links. The contemplated systems and methods will be described in terms of this open Web environment, though it will be appreciated by those having ordinary skill in the art that alternatives may be substituted without departing from the scope of the present disclosure.

In the context of the exemplary networked computing environment 10, the term "client" is understood to refer to the role of the client device 18 as a requestor of data or services, while the term "server" is understood to refer to the role of the server computer system 16 to provide such requested data or services. It is possible that the components of the server computer system 16 may request data or services in one transaction, and provide data or services in a different transaction. The illustrated networked computing environment 10 is generalized, and it will be appreciated that there are numerous variations with respect to implementation specificities that have not been set forth in the present disclosure.

Although depicted as a conventional desktop personal computer, the client device 18 is understood to encompass any general purpose data processing apparatus with which a user 20 may interact. Broadly, the client device 18 has a data processor, a memory, one or more input devices, and one or more output devices. A basic configuration that may be suitable for use in connection with the systems and methods of the present disclosure may include an output device that is a display screen that can generate a graphical output and an input device by which inputs can be provided. Furthermore, because data exchanges with other systems and the Internet 12 in general is contemplated, the client device 18 is also understood to include a networking and data communications modality.

The data processor of the client device 18 executes a series of pre-programmed instructions based on certain inputs provided by the user 20 via the input devices, to generate resultant outputs on the output devices. The instructions/software may be stored in non-transitory media such as the aforementioned memory. These instructions may be those of an operating system that controls the basic functions of the client device 18, including file management, input/output, and so forth. The instructions may also be those of a web browser application that generates and transmits the requests for the aforementioned webpages from the web/server computer systems 16, receives the requested webpages, and renders its contents.

The client device 18 may be any data processing device with the aforementioned basic features and functions. Thus, when referring to the client device 18, other like devices such as tablets, mobile communications devices and smart phones, Internet-enabled television sets, e-book readers, gaming consoles, personal digital assistants, wearable computing devices, and any other Internet-capable convergence devices may be substituted.

The web/server computer systems 16 may be a conventional data processing apparatus with a processor, memory, and Internet networking functionality. The server computer systems 16 may each include an operating system that manages the various hardware functions thereof, along with a Hypertext Transfer Protocol (HTTP) server application. One of the basic functions of the HTTP server application involves receiving page requests from the browser application running on the client device 18, retrieving the requested webpage 14 stored on, for example, a storage device 22 of the server computer system 16, and transmitting the webpage 14 to the client device 18. Additional functionality such as enforcement of access restrictions and the like may be implemented with scripts that are executed on the server computer system 16. The various embodiments will be described in terms of data services provided over HTTP and by the HTTP server, to serve HTML-based webpages 14 but other protocols and server applications therefor may also be utilized. The webpage 14 may be more generally referred to as a document object model (DOM) element, and thus need not be limited to HTML documents.

It will be recognized that the web browser application can request, and the HTTP application can serve, files other than webpages 14 that are formatted in accordance with Hypertext Markup Language (HTML). For example, the Portable Document Format (PDF) is one of the more widely used for document sharing, as it is possible to preserve the formatting and visual appearance of documents regardless of platform specifics. The web browser application itself, as part of its HTML-rendering capabilities, typically does not handle PDF documents, but rather, may rely upon an external application or plug-in. Nevertheless, due to the additional functionality provided by the browser plug-in, it may be possible to render PDF documents within the browser window. Common file formats with browser plugins that open or otherwise render its contents within the browser window include video and audio files with extensions such as .mov, .mp3, and .mp4, as well as multimedia platform data files such as Flash (.swf), and so on. The file extension designates a default external application with which the file is to be opened.

Other file formats may not include in-browser plugins that may be called upon to open the file within the browser window. Only upon invoking a dedicated external application, can its contents be displayed. Such native document formats include, for example, .doc/.docx for word processing documents that can be opened and edited with Microsoft Word, .xls for spread sheet documents that can be opened and edited with Microsoft Excel, .ppt for presentation documents that can be opened and edited with Microsoft PowerPoint, .psd and .ai for graphics and images that can be opened and edited with Adobe Photoshop and Adobe Illustrator, respectively. Although specific file formats and corresponding file name extensions are noted herein, it is to be understood that any format with any file name extension may be utilized.

All of the aforementioned files, regardless of the format specifics, may be referred to as a downloadable file 24. In most cases, the entirety of the file 24 is transferred to the client device 18 before opening/rendering. Alternatively, the file 24 may be virtually loaded and displayed in a temporary viewer on the client device 18, or in a remote viewer that is accessible via the client device 18. In some cases, the file 24 may be a container for streaming media, and specify a connection to a media streaming source. Generally, the downloadable file 24 is understood to be any data file that is opened or otherwise handled outside of the rendering of the webpage 14 within the browser application. The transfer of the downloadable file 24 from the server computer system 16 to the client device 18, however, is understood to be the same as the transfer of the webpage 14. For the downloadable file 24, however, there may be a browser sub-module referred to as a download manager that initiates the retrieval and stores the file to the local file system. The downloadable file 24 may be stored on the storage device 22, though other storage modalities such as cloud-based services are also envisioned.

In further detail, for purposes of illustrating the various embodiments of the present disclosure, the downloadable file 24 is stored on a custodial host site 26 that is accessible by the client device 18 over the Internet 12. A resource identifier may identify the downloadable file 24. In one embodiment this is a Uniform Resource Identifier (URI), which is a string of characters that are used to identifier a name or a Web resource. The identification is understood to enable interaction with representations of the resource over a network using specific protocols. For example, a URI for the downloadable file 24 may be "http://www.classbrain.com/download.pdf," where "http://" refers to the protocol to be utilized by the browser application to retrieve a particular file, also referred to as the scheme, "www.classbrain.com" refers to the server by its domain name from which the downloadable file 24 may be retrieved, i.e., the custodial host site 26, and may also be referred to as a site authority. Furthermore, "download.pdf" refers to the file name of the downloadable file 24.

Although the exemplary embodiments will be described in terms of the static downloadable file 24 that is stored locally on the custodial host site 26, adaptations to other asset access modalities is contemplated. The downloadable file 24 may also be dynamically generated, stored remotely or virtually, and may be part of the open Web environment. Along these lines, adaptation to existing file delivery systems such as Flickr, YouTube, Slideshare, and so on, with the accounts thereof controlled by the publisher is also possible. Those having ordinary skill in the art will recognize the modifications needed to various features of the present disclosure for such adaptations.

The exemplary environment 10 includes a first publisher site 28a, a second publisher site 28b, and a third publisher site 28c. The first publisher site 28a has a webpage 14a-1 that includes, among other content, a hyperlink 30a to the downloadable file 24, as well as a webpage 14a-2 that similarly includes a hyperlink 30b to the downloadable file. The second publisher site 28b has a second webpage 14b that also includes, among other content, the hyperlink 30b to the same downloadable file 24. Furthermore, the third publisher site 28c has a third webpage 14c that includes the hyperlink 30b to the downloadable file 24. As referenced herein, the publisher site 28, along with the corresponding webpage 14 that is generated thereby, is understood to be that which is controlled by the publisher and served to the requesting user 20. The webpages 14 may be static or dynamically generated.

By way of example, the custodial host site 26 on which the downloadable file 24 is stored may be the same server computer system 16 as that of the first publisher site 28a. In this regard, the domain for the custodial host site 26 and the first publisher site 28a may be the same, e.g., www.classbrain.com. The second publisher site 28b may be separate from the first publisher site 28a, and accordingly has a different domain, e.g., www.classbraingames.com. In this example, the first publisher site 28a and the second publisher site 28b may be owned and operated by the same publisher, but is understood to be a different site. The third publisher site 28c may be a completely separate and unrelated server computer system 16 from the others described above, with an example domain of www.nobrain.com.

Thus, as shown, it is possible for different publisher sites 28 (three in this illustrated example) to link to the same downloadable file 24. While the first publisher site 28a and the second publisher site 28b may be authorized to monetize the downloadable file 24, the unrelated third publisher site 28c may not be. Because the downloadable file 24 is made accessible on the open Web environment 10, downloads are permitted for all users 20 connected to the Internet 12 regardless of monetization.

One embodiment of the present disclosure contemplates a method for resolving custodianship of the downloadable file 24. Custodianship refers to the relationship or affiliation between a given publisher site 28 or webpage 14, and the downloadable file 24 to which a link is made available from the publisher site 28 or webpage 14. That a given publisher site 28 has custodianship over the downloadable file 24 also designates the authorization to monetize each download instance thereof, that is, every access of the downloadable file by the users 20.

Other embodiments of the present disclosure contemplate the monetization of downloadable assets, and the resolution of custodianship is understood to facilitate proper monetization without placing these assets in separate, secured directories or specially firewalled systems. It is recognized that many such files are in the public domain, available through the Creative Commons for commercial distribution, or otherwise available for use by a publisher by a copyright holder or owner. The publisher may not necessarily be a creator of a particular work, and so custodianship is intended to characterize the authorization that the publisher has to monetize the downloadable file 24. Whether or not the publisher has obtained the legal right to use the downloadable file 24 by linking to the same from its webpage 14 may be resolved contractually, similar to the way other content such as photographs and written articles may be certified or designated by the publisher as authorized use. The lack of custodianship by a given publisher does not necessarily equate to an infringement of the downloadable file 24, just that the publisher does not have the monetization right.

Figure 2:
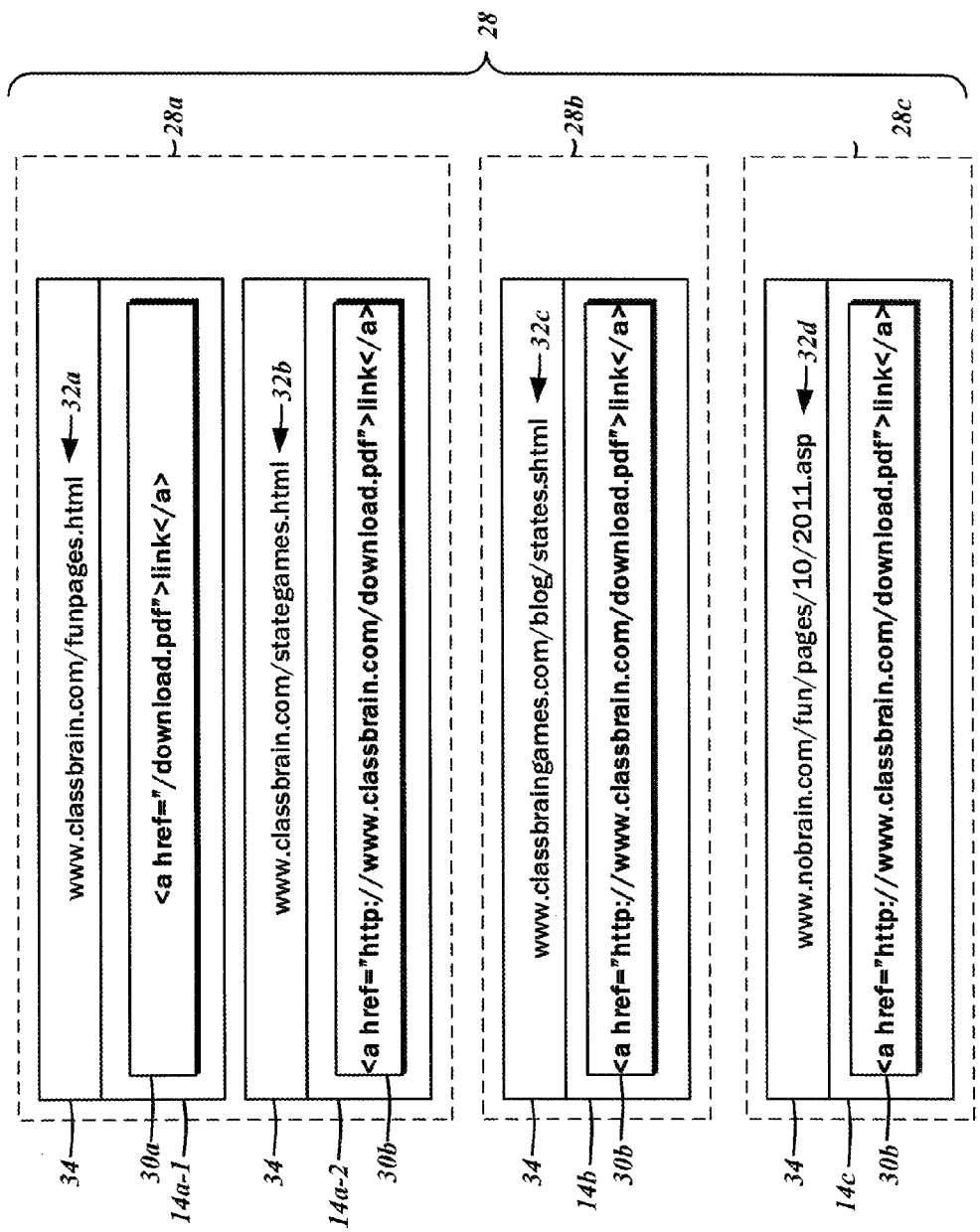
FIG. 2 is a diagram illustrating webpages served by different publisher sites each linking to one or more exemplary downloadable files, in accordance with at least one embodiment.

With reference to the diagram of FIG. 2, custodianship may be generally determined based upon an evaluation of the resource identifier, e.g., the hyperlink 30 to the downloadable file 24 included in the webpage 14, and a referrer publisher identifier 32 that specifies an origin from which the request for the downloadable file 24 was generated. In the illustrated example, the full resource identifier of the downloadable file 24 is "http://www.classbrain.com/download.pdf." The absolute base URL or site authority for determining custodianship is classbrain.com, and may be identified independently of the domain name as "classbrain."

The first publisher site 28a serves a webpage 14a that includes a relative hyperlink 30a, which is a form that can be utilized when the downloadable file 24 is stored on the same server computer system 16/storage path as the referring document or webpage. The relative hyperlink 30a is specified as "/download.pdf," meaning that the downloadable file 24 resides in the same server directory structure as that which contains the webpage 14a-1, e.g., "www.classbrain.com/funpages.html." The diagram of FIG. 4 also depicts headers 34 corresponding to each of the webpages 14 with the referrer publisher identifier 32a. The custodial host site 26 may thus be the same as the first publisher site 28a. It is understood that when there is a relative hyperlink 30, the referring document or site, e.g., the first webpage 14a or the first publisher site 28a, has a custodial relationship with the downloadable file 24.

The first publisher site 28a also serves a webpage 14a-2 that includes an absolute hyperlink 30b. This form is understood to be optional when the downloadable file 24 is stored on the same server, and specifies the scheme, domain, and filename in its entirety. Because no assumptions can be made from a specified absolute hyperlink 30b, a further comparison thereof is made with the referrer publisher identifier 32b, which in this example, is "www.classbrain.com/stategames.html" as specified in the header 34 of the second webpage 14*a*-2. Because the domains, or absolute base URLs are the same, again, the referring document or site, e.g., the second webpage 14*b* or the second publisher site 28*b*, has a custodial relationship with the downloadable file 24.

The second publisher site 28*b* serves a webpage 14*b* that also includes the same absolute hyperlink 30*b* discussed above. In this particular example, as set forth in the header 34 of the webpage 14*b*, the referrer publisher identifier 32*c* is "www.classbraingames.com/blog/states.shtml." In this case, the resource identifier/hyperlink 30*b* specifies a domain of the downloadable file 24 as "www.classbrain. com," which is different from "www.classbraingames.com." Accordingly, based upon a comparison of the domain names or absolute base URLs alone, a conclusion would be reached that the second publisher site 28*b*/webpage 14*b* does not have a custodial relationship with the downloadable file 24. However, despite having different domains, the second publisher site 28*b* may be owned or otherwise managed by the publisher of the first publisher site 28*a*, and so there may be a custodial relationship regardless.

The third publisher site 28*c* serves a webpage 14*c* with the same absolute hyperlink 30*b* included therein. The referrer publisher identifier 32*c* is "www.nobrain.com/fun/pages/10/ 2011.asp," and is specified in the header 34 of the webpage 14*c*. Not only does the third publisher site 28*c* differ in terms of domain names, that is, the absolute base URL to that specified in the resource identifier of the downloadable file 24, there is understood be no custodial relationship. As such, the third publisher site 28*c* does not have the right to monetize the transfer of the downloadable file 24 because it would otherwise be allowed to profit from a deep link and infringe upon the rights of the custodial publisher, e.g., ClassBrain. The further determination of whether the dissimilar domains are or are not in a custodial relationship with the downloadable file 24 to which there is a hyperlink 30 will be discussed more fully below.

Although the custodial relationship can be resolved intrinsically in relation to the downloadable file 24 and the webpages 14*a*-1, 14*a*-2, additional validation may be necessary with respect to the webpages 14*b* and 14*c*. Neither of the webpages 14*b* and 14*c* have a referrer publisher identifier 32 with a domain that is the same as that of the hyperlink 30. Along these lines, while many publishers only run one publisher site 28, others may have two or three, while other publishers still may operate hundreds, if not thousands of different sites each with different domains. The block diagram of FIG. 1 illustrates a monetization system 36 that may implement one or more aspects of the functionality of further resolving the custodianship of the downloadable file 24, in addition to the aforementioned intrinsic analysis of the referrer publisher identifier 32 and the resource identifier/ hyperlink 30.

Generally, the monetization system 36 authenticates the classbrain.com site (the first publisher site 28*a*) as the primary domain belonging to the publisher Classbrain. Furthermore, others, including the second publisher site 28*b*, may likewise be authenticated as belonging to the publisher Classbrain. To this end, the monetization system 36 is understood to be another server computer system 16 that is capable of storing and processing data.

Figures 3, 4:
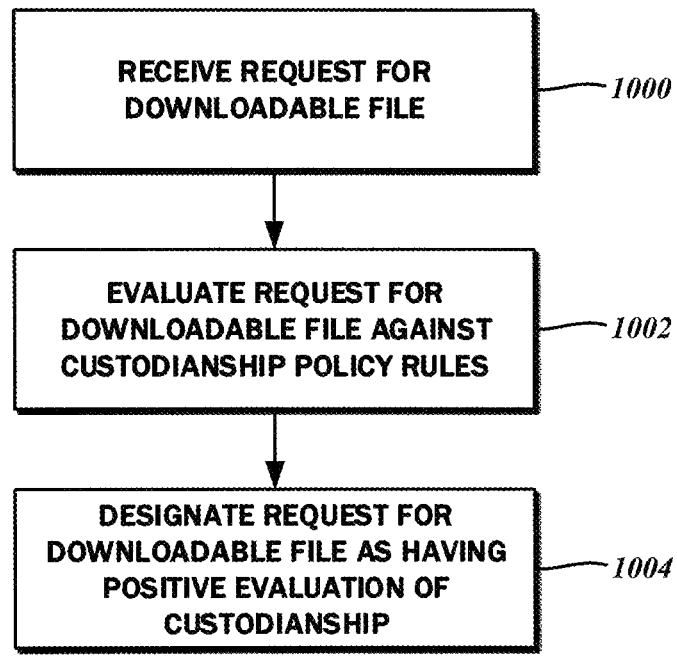
FIG. 3 is a table representative of an exemplary approved publisher domain database, in accordance with at least one embodiment.
FIG. 4 is a flowchart of one embodiment of a method for resolving custodianship of the downloadable file, in accordance with at least one embodiment.

The association of the first publisher site 28*a*. e.g., www. classbrain.com, and the second publisher site 28*b*, e.g., www.classbraingames.com, to the publisher Classbrain may be stored on the monetization system 36 in an approved publisher domain database 38 (that stores the absolute base URL) and is confirmed/validated upon request. As shown in the table of FIG. 3 representative of the approved publisher domain database 38, the www.classbrain.com domain and the www.classbraingames.com are included, whereas the www.nobrain.com domain is not. Because the publisher Classbrain and the custodial host site 26 thereof have been authenticated, it is possible for the proper publisher to monetize a transfer instance of the downloadable file 24, even though the request originated from the third publisher site 28*c*/webpage 14*c*.

By authenticating a custodial host site 26 as belonging to a particular publisher, the domain of the referring website, that is, the publisher site 28 may be matched against the format or domain/site authority specified in the hyperlink 30. The determination of whether or not there is a custodial relationship between the publisher site 28 and the downloadable file 24, as well as whether or not the publisher site 28 has the right to monetization is thus possible. Without authentication of the publisher site 28, another publisher site may erroneously, or in some cases maliciously claim the asset of another publisher as its own.

According to one embodiment of the present disclosure, upon authentication of the publisher site 28, a site authentication identifier is stored thereon. The site authentication identifier may include an authentication file, metadata, site scripts, or other identifiers. Besides the publisher site 28, the site authentication identifier may be stored on a file system or a cloud provider system. The authenticated publisher site 28 is recognized by the monetization system 36 as having been preliminarily cleared to monetize download instances. It is understood, however, that other conditions for monetization may also be imposed by the monetization system 36.

Figure 5A:
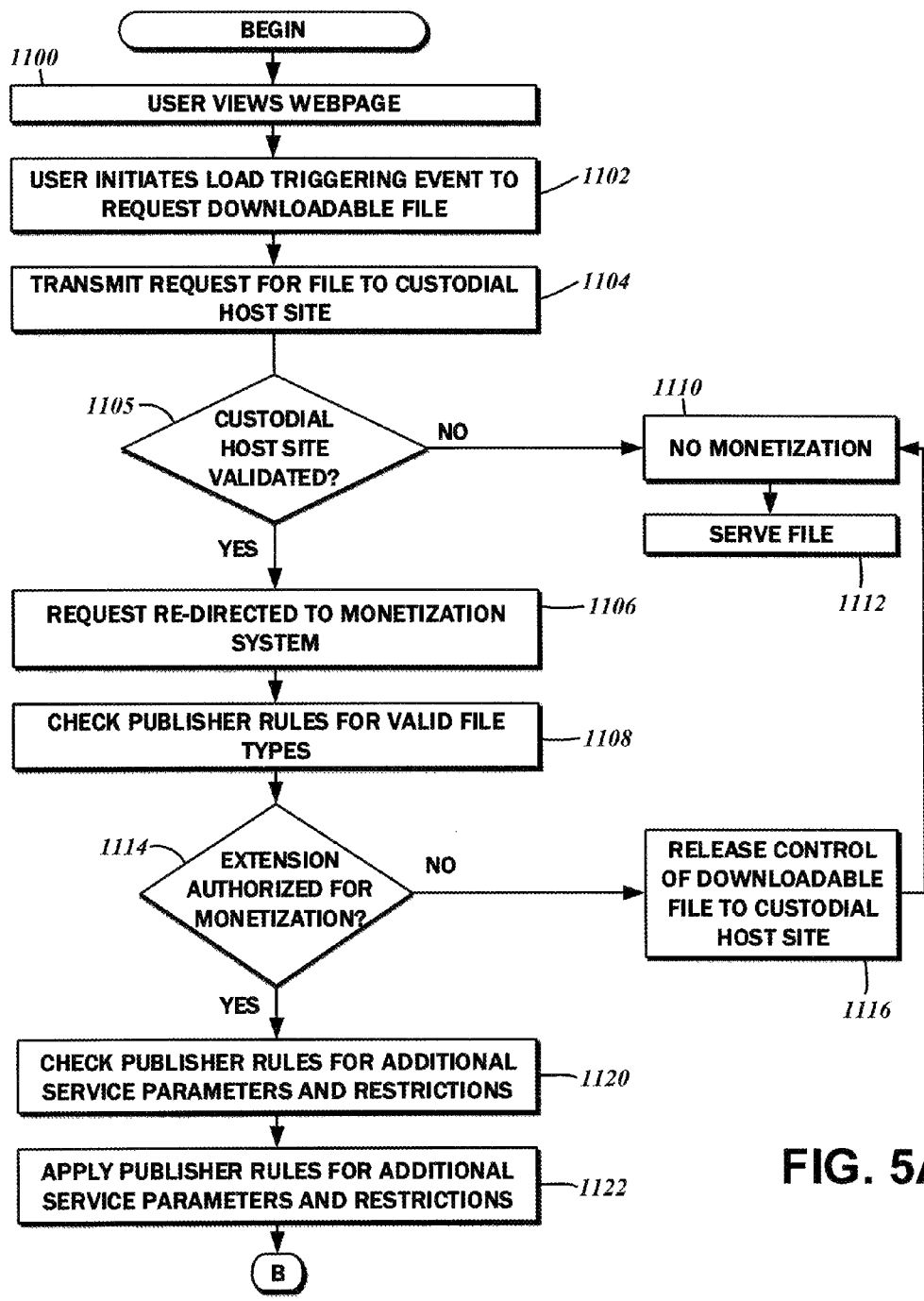
FIGS. 5A and 5B are flowcharts showing additional details of the method for resolving custodianship of the downloadable file, in accordance with at least one embodiment.
Figure 5B:
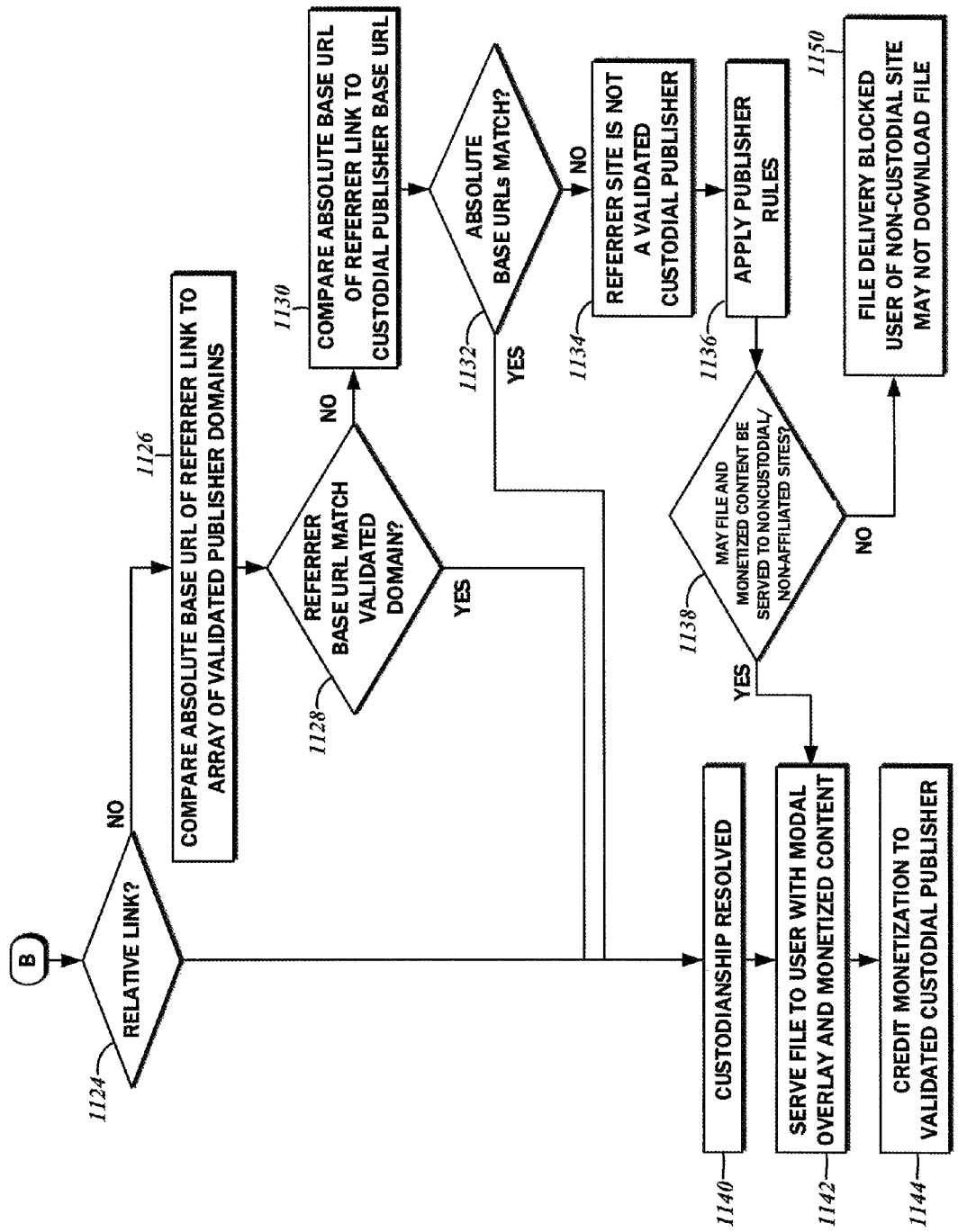

A broad, general depiction of the method for resolving custodianship of the downloadable file 24 that is stored on the custodial host site 26 is illustrated in the flowchart of FIG. 4. According to one embodiment, this method begins with a step 1000 of receiving a request for the downloadable file 24 from the client device 18. Furthermore, with reference to the flowcharts of FIGS. 5A and 5B, additional details of a specific sequence of evaluating custodianship policy rules will be considered. Prior to receiving the request, the client device 18 may receive the webpage 14 that contains the hyperlink 30 to the downloadable file 24 from the publisher site 28 in accordance with a step 1100. This may, in turn, be preceded by a request for the webpage 14.

When the user 20 activates the hyperlink 30 on the client device 18, a software command such as the POST or GET command in the HTTP context is generated. This is understood to correspond to a step 1102 of the user 20 initiating a hyperlink load-triggering event to request the downloadable file 24. Any number of other load-triggering events that could be substituted including activating an offsite link, an onMouseDown event, an onMouseUp event, and an onClick event. Additionally, the capture of a QR (Quick Response) code, a SPARQCode or other like special barcodes that are designed to be photographed with on-board cameras of smartphones and direct the user to a particular webpage or downloadable file, as well as vocal, vision-tracking, or body-tracking commands for wearable Internet devices, are also intended to be encompassed within the step 1102.

The aforementioned request, resulting from the load-triggering event is understood to include the resource identifier, e.g., http://www.classbrain.com/download.pdf that particularly identifies the domain (absolute base URL), path, and file name of the downloadable file 24, along with the referrer publisher identifier that specifies the origin from which this request was generated, e.g., www.classbrain.com/ stategames.html. The request for the downloadable file 24 is differentiated from a retrieval of another webpage 14 based upon the file extension. For example, the downloadable file 24 has a .pdf extension, while the webpage 14 may have a .htm, .asp, .html, .shtml, .cfm, or any other standard webpage extension. The request is transmitted to the custodial host site 26 in accordance with a step 1104.

The authentication status of the publisher site 28 may be checked in a decision branch 1105. If authenticated, then the procedure continues to the step 1106, where the request is redirected to the monetization system 36 and the publisher rules are implemented in step 1108 If the custodial site has not completed its validation process within the system 1105, or the publisher rules have not authorized the file extension type for monetization, the script is stopped and no monetization is permitted in accordance with a step 1110. The downloadable file 24 is served to the client device 18 normally per step 1112.

Referring again to the flowchart of FIG. 3, the method for resolving custodianship of the downloadable file 24 continues with a step 1002 of evaluating the aforementioned request against one or more custodianship policy rules. As will be described in further detail below, each of the custodianship policy rules may be defined by a custodianship parameter that is related to a part of at least one of the resource identifier, e.g., the hyperlink 30, and the referrer publisher identifier 32, as well as a criterion value that corresponds to a positive evaluation of custodianship. The specific criterion values will be discussed in greater detail. The monetization system 36 is understood to make these evaluations, and the criteria therefor may be stored locally or remotely.

Several custodianship parameters of the custodianship policy rules are contemplated in accordance with the embodiments of the present disclosure. One is a file extension of the downloadable file as specified in the resource identifier, while another is a format of the resource identifier. Additionally, another may be a custodial domain on which the downloadable file is stored as specified in the resource identifier. Yet another is a referral domain as specified in the referrer publisher identifier. These custodianship policy rules 37 may be stored on the custodial host site 26, the monetization system 36, or any other local or remote data storage system. Those having ordinary skill in the art will recognize that other custodianship parameters may be established.

In a step 1108, the monetization system 36 may check the custodianship policy rules for valid file types, which may be defined by the publisher. This is understood to include a listing of all file types/extensions that are authorized for monetization, and the file extension of the downloadable file 24 as specified in the resource identifier is reviewed for inclusion in a decision step 1114. If the specified extension is found, then monetization may be permitted, and the method proceeds to the next step. Otherwise, control of the downloadable file 24 is released back to the custodial host site 26 in a step 1116. Monetization is stopped per step 1110 and the downloadable file 24 is served to the client device 18 normally per step 1112. The evaluation does not stop with determining whether the specified file extension is authorized for monetization, and there is a step 1120 in which the publisher rules are checked for additional service parameters and restrictions. Then, in a step 1122, these additional service parameters and restrictions are applied.

The next evaluation in a decision step 1124 is whether the resource identifier/hyperlink 30 is a relative link. As mentioned above, if the hyperlink 30 is a relative link, the webpage 14 including such hyperlink 30 is presumed to have a custodial relationship to the downloadable file 24. Custodianship is thus resolved in a step 1140, and the downloadable file 24 is served along with monetized content that may be presented within a modal overlay in accordance with a step 1142, as will be described in further detail below. Furthermore, the custodial publisher may be credited with the monetization in a step 1144.

Otherwise, the analysis proceeds to the next evaluation in a step 1126, which involves a comparison of the absolute base URL of the referrer publisher identifier 32 to those in the publisher domain database 38 as being associated with a particular publisher that has custodianship over the downloadable file 24. In a decision step 1128, if the particular domain name is found in the publisher domain database 38, custodianship is resolved in accordance with the step 1140, and the downloadable file 24 along with the monetized content is served to the client device 18 in a step 1142. Again, the custodial publisher may be credited with the monetization in a step 1144.

If the domain is not listed in the publisher domain database 38, the analysis continues with a comparison of the domain name as set forth in the resource identifier/hyperlink 30 and the referrer publisher identifier 32 in the webpage 14 according to step 1130. If there is a match as evaluated in a decision step 1132, custodianship is resolved per step 1140 and proceeds to request the monetized content in the step 1142. Otherwise, the publisher site 28 is deemed to not to have custodianship of the downloadable file 24 according to a step 1134, and additional publisher rules are applied in a step 1136. Generally, this involves, per decision step 1138, determining whether the downloadable file 24 may be served regardless of the custodianship status. That is, even if the referring publisher site 28 is non-custodial and/or not affiliated, whether the downloadable file should be transmitted to the user 20 requesting the downloadable file 24 therefrom. If the publisher's policy so dictates, the downloadable file 24 along with the monetized content is served to the client device 18 in a step 1142. Again, the custodial publisher may be credited with the monetization in a step 1144. However, if not, the file delivery may be blocked according to a step 1150. Furthermore, an optional system alert may be displayed, which informs the user 20 that the file is monetized and restricted and cannot be downloaded from a link from a non-custodial publisher site to the custodial host site 26.

Once the status of a hyperlink 30 is defined or identified as custodial or non-custodial to the domain of the particular publisher site 28, it is possible for the monetization system 36 to record the same with a locally or remotely stored array.

Referring to the flowchart of FIG. 3, the aforementioned evaluation steps can be summarized as a step 1004 of designating the request for the downloadable file 24 as having the positive evaluation of custodianship. Again, this designation can be made in response to parts of at least one of the resource identifier and the referrer publisher identifier matching criterion values for at least two particular ones of the custodianship policy rules.

The monetization system 36 plays a role in resolving custodianship of the downloadable file 24, particularly when there are multiple publisher sites 28 under the dominion of a single publisher, and the comparison of specified domain names in the resource identifier/hyperlink 30 and the referrer publisher identifier 32 is insufficient. As indicated above, it is possible to define the included publisher sites 28 in the publisher domain database 38 associated with the monetization system. In some embodiments, the monetization system 36 may be a subsystem of a content management platform of the publisher site 28, or of the publisher site 28 itself. One of the functions of the monetization system 36 is the delivery of monetized content, which, as utilized herein, refers to any content that can be served to the user 20 to monetize assets. Such content may include advertisements, sponsored searches, images, advertorials, QR codes, SPARQCodes, affiliate links, and so on.

Before the delivery of the monetized content to the users 20 can commence with the monetization system 36, an authentication procedure in which the aforementioned server file, header code, or the like is provided to the publisher site 28 may be involved. Again, this site authentication identifier may demonstrate that the publisher has administrative control over the files in the domain(s) in question, and has been approved by the monetization system 36 or a related third party application programming interface. Further publisher sites 28 may be similarly identified for cross-domain monetization of assets.

In one embodiment of the configuration/authentication procedure, the publisher may log in to the monetization system 36 via a web-based dashboard interface 40 as shown in the screen capture of FIG. 6. The publisher can create a general profile 42 in the monetization system 36. Basic information such as an account name and contact information (street, city, state, zip code, and country), as well as telephone and fax numbers may be provided in the profile 42. Additionally, preferred localization settings such as language and currency may be specified.

After the basic account is set up, the publisher sets up and authenticates the primary domain as well as any secondary domains. Continuing with the example shown in FIG. 1, the primary domain of the publisher Classbrain may be www-.classbrain.com, and a secondary domain may be www-.classbraingames.com. Still referring to the screen capture of FIG. 6, the dashboard interface 40 further includes a domain setup section 44. As shown, a first field 46*a* indicates the name of the publisher. The publisher is assigned an alphanumeric publisher identifier that may include the publisher's company or corporate name, a primary validated domain name, or any other sequence of characters as desired. The publisher identifier is indicated in a second field 46*b*. Similarly, a site identifier that may be based on the domain name of the publisher site 28, along with any other sequence of alphanumeric characters as desired. The site identifier is indicated in a third field 46*c*. A fourth field 46*d* shows that the primary domain has been authenticated, and a fifth field 46*e* shows the URL of this particular publisher site 28, that is, the primary domain. A descriptor of the publisher site 28 may be entered in a sixth field 46*f*.

One of the conditions for resolving custodianship and determining whether a particular downloadable file 24 is to be monetized involves the file type or extension. That is, only certain file types may be designated for monetization. The domain setup section 44 accepts inputs for these designations, and includes checkboxes 48 therefor. To the extent any changes are to be committed, after entering the desired values in the form fields 46, an "edit" button user interface element 50 may be selected.

After the file types for monetization have been selected via the checkboxes 48, one embodiment of the present disclosure contemplates the scanning of content upload directories on the custodial host site 26 to build a local lookup table of all eligible downloadable files 24. This table may be exported as an XML (eXtensible Markup Language) file, or in any other suitable format. Further levels of control over monetization of the individual files identified and listed in the lookup table are also possible by way of exemptions and/or additions, and different rules, tags, and branding may be applied thereto. At this point, the publisher may be requested to certify that all of the listed downloadable files 24 are legally under the custodianship of the publisher.

After the foregoing selections are made, the monetization system 36 generates the domain authentication codes as a site file or page header codes, in response to the user 20 activating a "generate code" button user interface element 52. The authentication code may also be generated by a third party application programming interface. The publisher may then manually install the authentication code on the specific webpages 14 that includes the hyperlinks 30 to a downloadable file 24 to be monetized. The monetization system 36 authenticates the publisher site 28 as a custodial site and for monetization, and is activated.

To the extent there are any publisher sites that have been added but not validated, the dashboard interface 40 is understood to indicate as such. Furthermore, the downloadable files 24 that have been identified may not be eligible for monetization, regardless of whether the policy rules have been set for the publisher site, if it has not been validated. Another embodiment of the dashboard interface 40 is shown in FIG. 7, which depicts multiple rows of listings and sublistings of fields and corresponding values. This representation may provide a user-friendly view of all of the publisher sites 28 being monetized.

Further secondary sites may be added to the publisher account in a similar manner by activating a "add new site" button user interface element 54, which invokes a different domain setup section 44 as shown in FIG. 7. If the secondary domain exists within the profile 42, a menu user interface element 56 may be used to select between such separate domain setup sections 44. The secondary domains are likewise associated with the publisher, for purposes of resolving custodianship to specific downloadable files 24 in the manner considered above, as well as for cross-monetization. A similar configuration, authentication, authentication code installation and validation procedure for the primary domain is also applicable for configuring the secondary domains.

With reference to the block diagram of FIG. 1, in addition to the foregoing functions, the monetization system 36 cooperates with a monetized content provider 58 to serve relevant monetized content in conjunction with the downloadable file 24. Along the lines of the monetized content referring to any content that can be served to the user 20 to monetize the assets of the publisher, the monetized content provider 58 is understood to be expansive and can include any agency, affiliate, search engine, or other supplier of the monetized content. A wide variety of monetized content can be presented, though various embodiments of the present disclosure contemplate a more targeted, customized approach in which one or more characteristics of the downloadable file 24 are matched to known presentation characteristics of the monetized content. To this end, additional attributes of the publisher system 28 and of the publisher may be defined via the dashboard interface 40, including tags related to the interest graph of each website or downloadable file 24, requested monetization partners, branding, white listed/blacklisted partner sites, age-appropriateness, and others.

Figure 8:
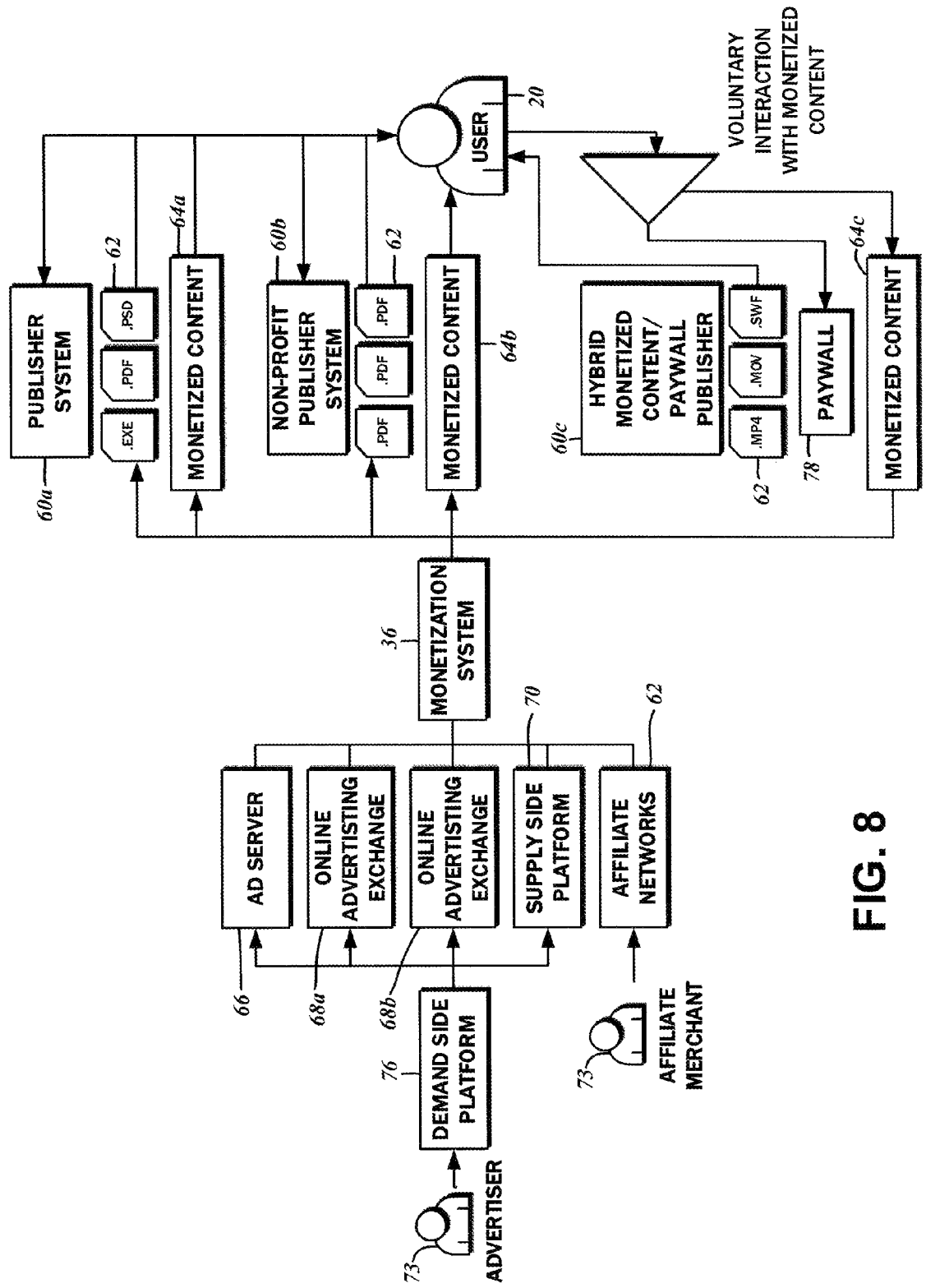
FIG. 8 is a block diagram of an environment showing relationships between the user, the monetization system, and the monetized content provider, in accordance with at least one embodiment.

Having described the methods for resolving custodianship and the configuration of the monetization system 36, further details pertaining to the process by which the request for the downloadable file 24 eventually transforms to the publisher's monetization thereof will be considered. The block diagram of FIG. 8 illustrates an exemplary operating environment where the user 20 interacts with various publisher sites 60a-60c to access downloadable assets 62, also referenced herein as the downloadable files 24. The present disclosure contemplates different types of publisher entities, three of which are depicted. The first publisher site 60a is a conventional for-profit publisher that presents a first monetized content 64a to the user 20, with that impression or other monetization being recorded to credit the publisher.

The monetization system 36 is in communication with various sources (monetized content providers 58) from which the particular monetized content 64a to be presented to the user 20 for the download instance can be retrieved. These include a conventional advertisement server 66, various online advertising exchanges 68a, 68b, a supply side platform 70 where the publishers manage advertising inventory and impressions, and affiliate networks 72 that work with affiliate merchants 73. Furthermore, advertisers 74 may interface with a demand side platform 76 to work with multiple advertisement exchanges. The variety of sources of the monetized content 64 is understood to provide a greater pool from which a best match can be made to the particular download instance. In most cases, a best match is that which most closely matches the rules for monetized content set by the publisher, with the highest value. It is understood that different advertisers can bid for the most desirous placements, and the monetization system 36 may be the central management point for the selecting and receiving the monetized content 64. As shown in the block diagram of FIG. 1, the selection of the "best match" bid may be performed by a bid analysis system 59, which utilizes a series of analytics 61.

Similar to the first publisher site 60a, the second publisher site 60b, which may be associated with a non-profit publisher, presents a second monetized content 64b to the user 20 after which the proceeds are provided as donations. This example would normally exclude affiliate merchant systems. The second monetized content 64b may have a different presentation that refers to the supplier of the monetized content and subsequent donation as a sponsor instead.

A hybrid arrangement where the user 20 is given the option to pay for the downloadable asset 62 instead is also contemplated. In further detail, there is a third publisher site 60c, which may license, sell, or otherwise exchange downloadable files such as movies, songs, music videos, e-books, and the like for payment. In the same way the other publisher sites 60a, 60b retrieved the best matched monetized content 64a, 64b, respectively, the third publisher site 64c likewise retrieves the best matched monetized content 64c, and presents the same to the user 20 if the interaction with an advertisement or other monetized content is selected by the user 20 and any necessary action completed, such as watching a complete video advertisement, the user 20 will gain access to the publisher's downloadable asset 62 for free, or in some cases for a reduced price. If not, the user 20 is directed to a paywall 78, at which point a payment can be made, or otherwise be granted access to the downloadable asset 62 by supplying appropriate credentials.

Figure 9A:
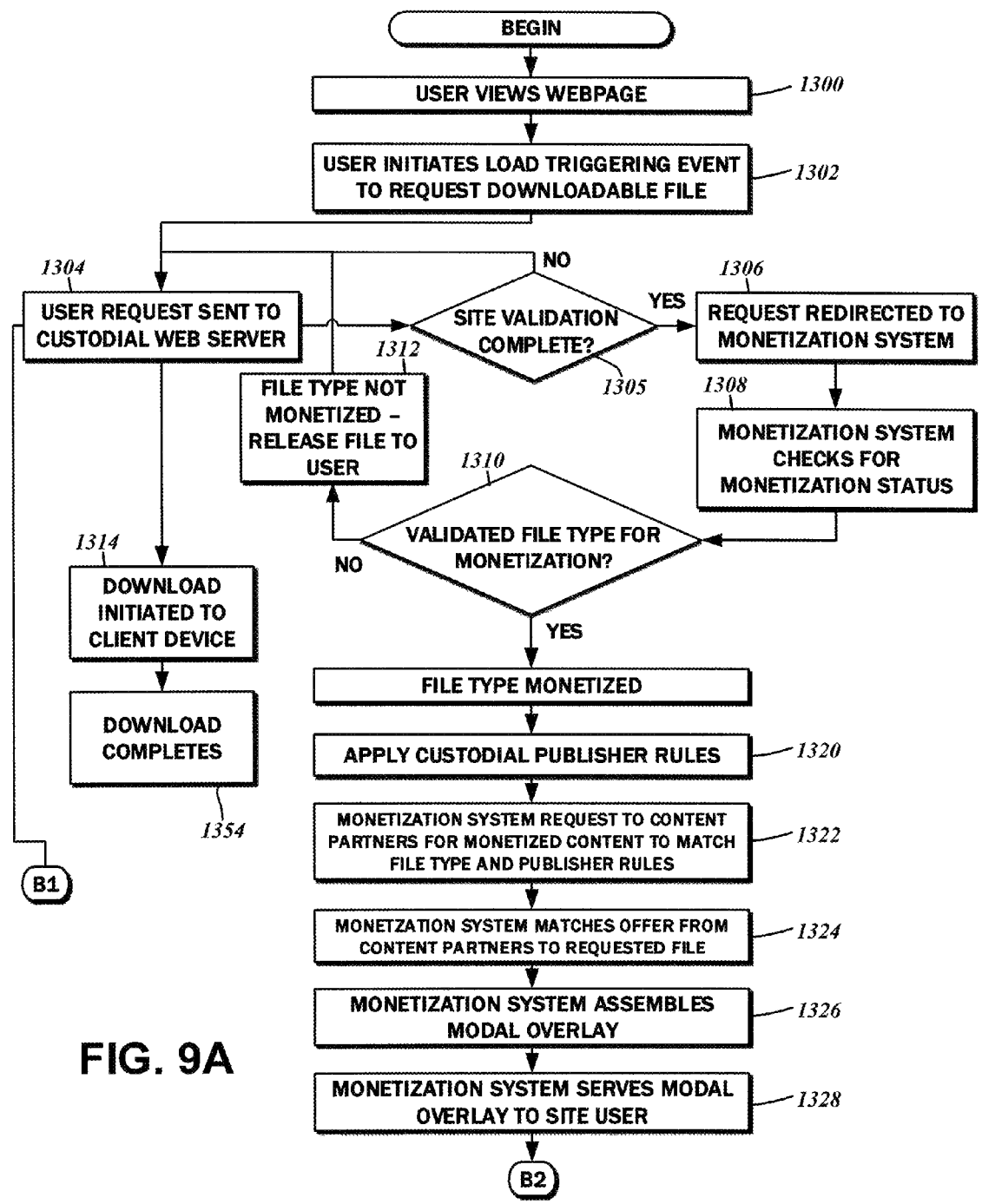
FIGS. 9A and 9B are flowcharts showing an overview of the monetization of the downloadable file, in accordance with at least one embodiment.
Figure 10:
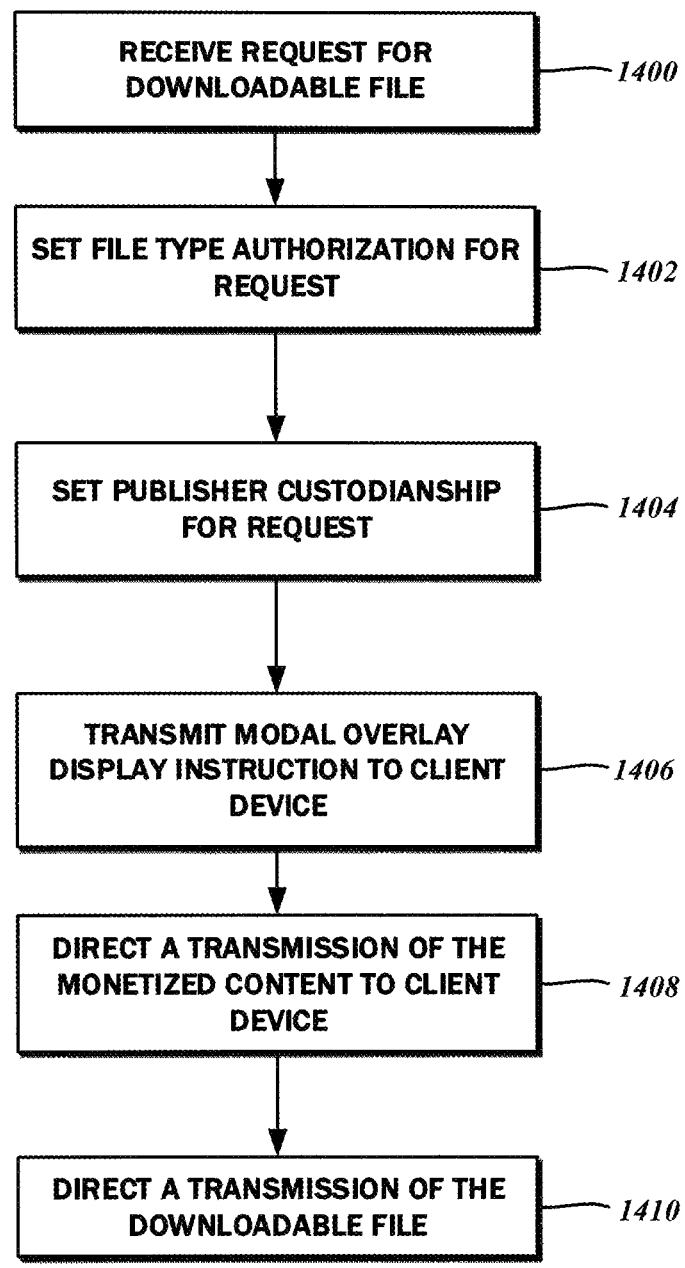
FIG. 10 is a flowchart of one embodiment of a method for monetizing the downloadable file, in accordance with at least one embodiment.
Figure 11:
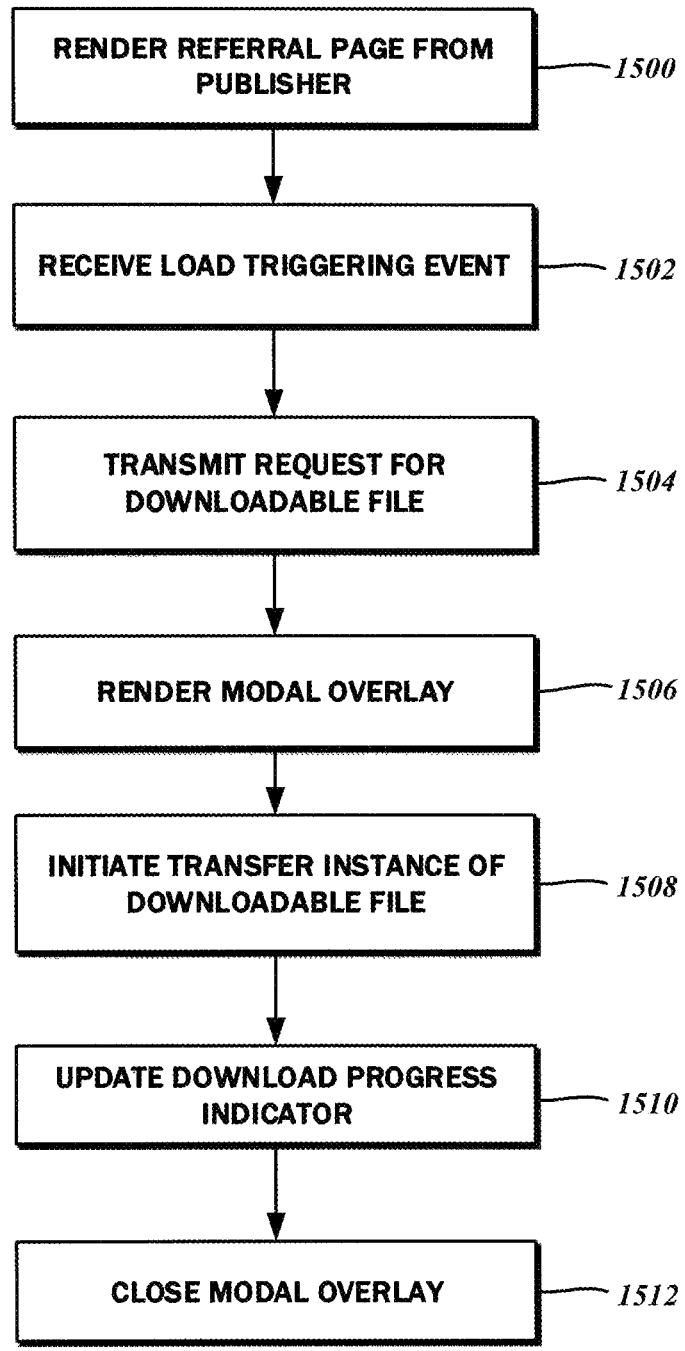
FIG. 11 is a flowchart of one embodiment of a method for presenting monetized content for the downloadable file, in accordance with at least one embodiment.

Further details of monetizing the downloadable file 24 will now be considered. With reference to the flowchart of FIG. 9A, the procedure begins with a step 1300 in which the user is viewing the webpage 14. As indicated above, the referring webpage 14 includes the hyperlink 30 to the downloadable file 24, and in a step 1302, the user 20 activates such hyperlink 30. This request is transmitted to the custodial host site 26 per step 1304. The flowchart of FIG. 10 depicts a method for monetization of the downloadable file 24 relative to the monetization system 36, and similarly begins with a step 1400 of receiving this request for the downloadable file 24. Along these lines, the flowchart of FIG. 11 depicts a method for presenting monetized content for the downloadable file. The corollary to the step 1300 of the user viewing the webpage is a step 1500 of rendering the referral webpage 14 from the publisher site 28, the corollary to the step 1302 is a step 1502 of receiving the load triggering event, and the corollary to step 1304 is a step 1504 of transmitting the request for the downloadable file 24 to the custodial host site 26.

According to some embodiments of the present disclosure, the transfer of the downloadable file 24 begins as a response to the request. Concurrently, further determinations may be made by the monetization system 36 in order to determine whether the download instance can be monetized or not. In this regard, after sending the user request, it may be redirected to the monetization system 36 according to a step 1306. Prior to this, however, in a decision block 1304, the validation status of the site is confirmed, and only upon an affirmative finding does the redirection occur. Otherwise, the user request is again transmitted to the custodial web server in accordance with the step 1304.

In a step 1308, the monetization system 36 checks for a monetization status, e.g., whether the file type is one that can be monetized and whether the referrer publisher identifier 32 has custodianship over the downloadable file. This determination may be made in a generalized decision step 1310. Referring to the flowchart of FIG. 10, such decision step may encompass a step 1402 of setting a file type authorization for the request based upon an evaluation of a file extension of the downloadable file included in an array of authorized file types. Furthermore, the decision step may also encompass a step 1404 of setting a publisher custodianship for the request based at least in part upon an evaluation of the resource identifier in the request. These two determinations have been extensively discussed above in relation to the contemplated method of resolving custodianship. If it is determined that the requested downloadable file 24 is not to be monetized (as established in a step 1312), then the download to the client device is initiated per step 1314 in accordance with one embodiment of the present disclosure. Alternatively, however, it is also possible to reject the download request as not being authorized.

On the other hand, if the requested downloadable file 24 is authorized for monetization, then additional custodial publisher rules are applied in a step 1320. Referring to the flowchart of FIG. 10, according to a step 1406, instructions to display a modal overlay on the client device 18 during the download process is transmitted to the client device 18. In further detail shown in the flowchart of FIG. 9A, this may include a step 1322 of the monetization system 36 requesting various content partners for the monetized content to match the file type and the publisher rules. As indicated above, this request may return multiple possible instances of monetized content, and the monetization system 35 is understood to match those to the particulars of the requested downloadable file 24 in accordance with a step 1324. Thereafter, the selected monetized content is assembled in a step 1326, and served in a step 1328.

Figure 9B:
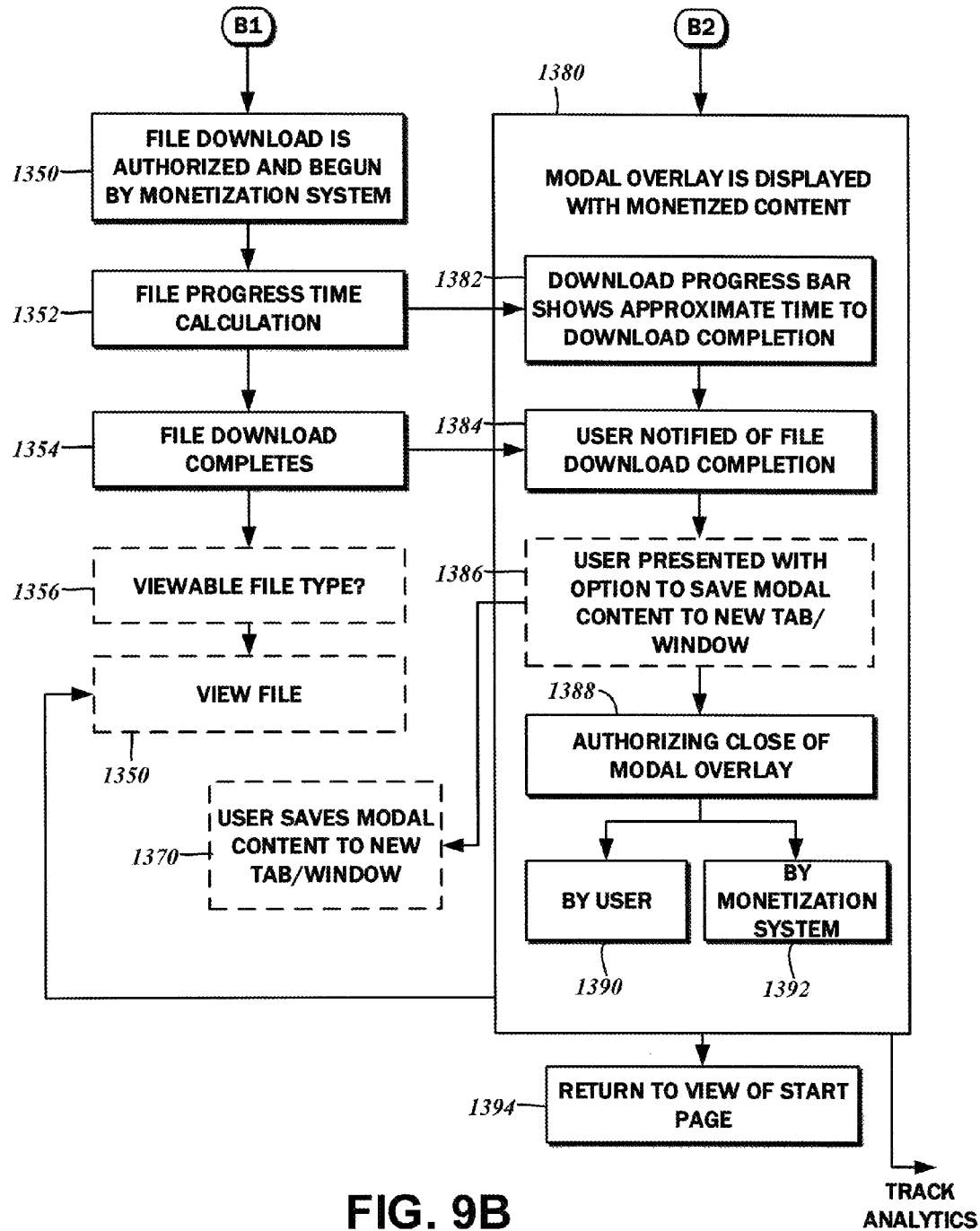

Referring to the flowchart of FIG. 10, this corresponds to a step 1408 of directing the transmission of the monetized content to the client device 1408, together with the aforementioned step of transmitting modal overlay display instructions. These two steps may take place substantially concurrently, that is, around the same time. The flowcharts of FIG. 9B further illustrate the various additional steps that are contemplated on the client device side. The side showing the steps beginning with label B1 involves the file download process, while the side showing the steps beginning with label B2 involves the modal overlay presentation process. Beginning with B1, a step 1350 is where the file download has been authorized and begun by the monetization system 36, which may correspond to a step 1508 of initiating the transfer instance of the downloadable file 24 as depicted in the flowchart of FIG. 11.

Contemporaneously with the initiation of the data transfer, starting with B2, a modal overlay is displayed on the client device 18 in accordance with a step 1380. Referring to the flowchart of FIG. 11, this may correspond to a step 1506 of rendering the modal overlay 80. The modal overlay remains activated until one of several possible events occurs. One exemplary implementation of a modal overlay 80 is illustrated in FIG. 13A, shown within a graphical interface 82 against a darkened background 84. The portion of the graphical interface 82 that is darkened is understood to be the referrer webpage 14, and contrasts with an undarkened or full brightness modal overlay 80. The modal overlay 80 is understood to be an interactive delivery system for the aforementioned monetized content.

In some circumstances, rather than starting the display of the modal overlay concurrently with the start of downloading, in order to make the impression of the monetized content more meaningful, a slight delay may be introduced. The speed at which the download proceeds is primarily a function of the size of the downloadable file 24, though the network connection speed also plays a role. The evaluation of the file size and the introduction of the aforementioned delay may be undertaken by the custodial host site 26. At the outset of the file transfer, the custodial host side 26 may also evaluate the specifics of the client device 18, the location from which the request for the downloadable file 24 originated, and other rule-based parameters to determine if the downloadable file 24 is to be served directly to the client device 18 or through the monetization system 36 with a virtual viewer.

Unlike existing advertisement presentation modalities such as banner advertisements, pop-ups, superstitials, and interstitials, the contemplated modal overlay 80 of the present disclosure is delivered concurrently with the transfer of the downloadable file 24. It will be appreciated that the user's navigation of the Web is not impeded, and indeed, augmented, as it is possible to navigate from webpage to webpage. While the user 20 is waiting for the downloadable file to complete its data transfer, various monetized content can be presented within that time period and in the modal overlay 80. As will be described in further detail below, the download progress may be tracked and presented within the modal overlay 80, and hence becomes a tool to enhance user experience. It is expressly contemplated that the modal overlay 80 is not limited to displaying advertisements in the conventional sense, and may be utilized to present a wide variety of monetized content as noted herein.

Although the modal overlay 80 may be presented in numerous ways, there are a few common elements. In particular, there may be a close icon that can be activated by the user 86 positioned on the upper right hand corner of the modal overlay, along the lines of a conventional windowing application interface. Additionally, as indicated above, tracking the progress of the data transfer is common amongst the various embodiments, so each is understood to include a download progress bar 88. As will be described in further detail below, the size, positioning, and orientation of the download progress bar 88, as well as its proffered design and animation characteristics for graphically representing the progress of the download, may be modified according to preference. Along these lines, another common feature is the presentation of the monetized content, and thus in each implementation of the modal overlay 80, there is a dedicated monetized content section 90. The positioning and size of the monetized content section 90 may be varied, though to present the monetized content most effectively, some degree of prominence is envisioned.

Continuing with the data transfer procedure that began with B1, the underlying information for the download progress bar 88 originates from a step 1352 of calculating the transfer progress time. According to one embodiment, a file manager running on the client device 18 may be called to make this calculation; an alternate method may be communicating. The resultant value is passed to the modal overlay 80, and as set forth in a step 1382, the approximate time to completion is shown in the rendering of the download progress bar 88. Referring to the flowchart of FIG. 11, these two steps may generally correspond to a step 1510 of updating the download progress indicator. The progress may also be indicated in terms of percentage completed, time remaining, and other such units that are known in the art. Since the progress of the transfer of the downloadable file 24 to the client device 18 is being regularly monitored, when it is completed in a step 1354, this is likewise presented in the modal overlay 80 in a step 1384. In at least one embodiment, notification of the file download completion 1384 may manifest as a presentation to the user of a "View Now" button or link, or one of similar meaning that allows the user to launch the file into a viewer or locate the file, and possibly activate the file, on their device, as described in more detail below.

As indicated above, prior to commencing the data transfer, optionally, the custodial host site 26 may determine whether or not the downloadable file 24 is viewable on the destination client device 18. If it has been deemed a viewable file in a step 1356, then in a step 1358 the downloadable file 24 is opened in the client device 18. If the file is such that it cannot be opened within the browser, the modal overlay 80 may include a link to the local file system on which the downloaded file was saved that can be activated to invoke the particular application therefor. Alternatively, invoking the external software application may be automated, along with the closing of the modal overlay 80. Per step 1386, the user may be presented with an option to save the content of the modal overlay. 24 to a new tab or window, and upon so selecting, this is accomplished in a step 1370. This optional step may or may not be implemented for particular configurations of the modal overlay 80.

The modal overlay 80 stays visible to the user 20 until its closing is authorized in a step 1388. This authorization may come from the user 20 in accordance with a step 1390, which takes action to terminate the modal overlay 80. For example, the close icon 86 may be activated. Alternatively, the authorization to close the modal overlay 80 may come from the monetization system 36. This may be the case when the download has been completed. Once the authorization is received to close the modal overlay 80, the user is returned without any further intervention to the underlying referrer webpage 14 in accordance with a step 1394. Referring to the flowchart of FIG. 11, this step is understood to have a corollary step 1512 of closing the modal overlay 80. To the extent that the modal overlay 80 was launched from an alternative platform other than the web, the user 20 is returned thereto. At any time the modal overlay 80 is closed while the download is still ongoing, it is understood that such data transfer can also be stopped. This behavior, however, can be adjusted depending on the desires of the publisher.

Figure 12:
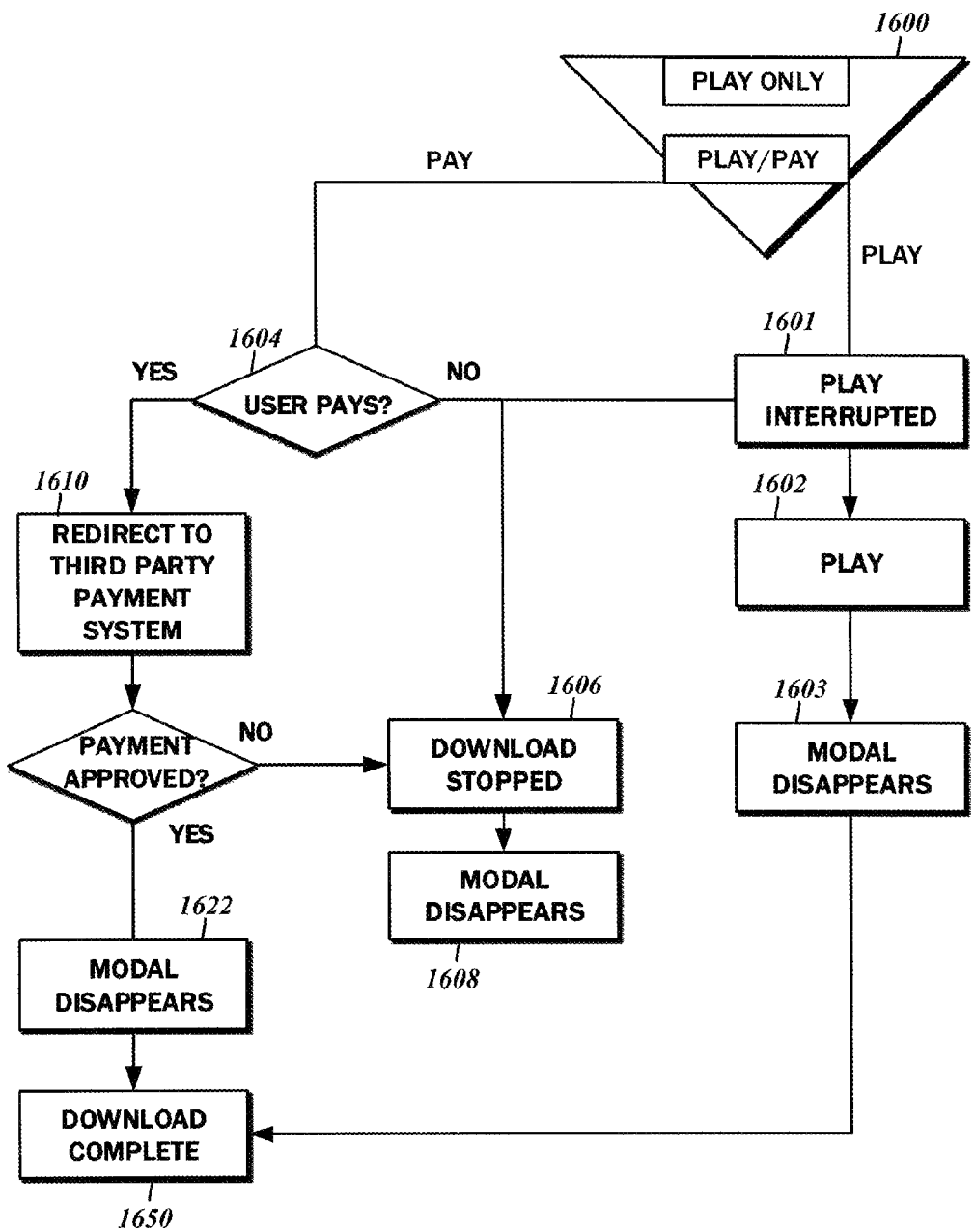
FIG. 12 is a flowchart further detailing the monetization of the downloadable file with a hybrid of monetized content and paywall based access restriction, in accordance with at least one embodiment.

An embodiment in which the user 20 is given a choice between viewing the monetized content and paying for the downloadable file 24 was briefly described above with reference to the block diagram of FIG. 8. Now, with reference to the flowchart of FIG. 12, as well as an example implementation of the modal overlay 80 shown in FIG. 13E, additional details of this hybrid monetization will be considered. By default, the modal overlay 80 is already being rendered in accordance with the foregoing procedures as discussed earlier. Thus, when the user interaction comes to a decision block 1600 at the very least, the modal overlay 80 with the monetized content is presented. The download may also be proceeding, but may be delayed to accept a choice from the user 20. At this point, the user may select to pay a fee to gain access to the downloadable file 24. With particular reference to FIG. 13E, this may be in the form of a skip button 92 that, when selected, prompts the user for payment but otherwise continues the presentation of the monetized content until complete. However, to the extent playback is interrupted as shown in a step 1602, the download is stopped in accordance with a step 1606. So long as playback continues and concludes without intervention per step 1602, the downloadable file 24 is released to download to the user's device in a step 1650 and, when complete, the modal overlay 80 disappears in a step 1603.

When the pay option is selected, the interaction proceeds to another decision block 1604. Even though the user 20 indicates that he/she will pay by activating the skip button 92, when it comes to actually doing so, that may not be the case. As such, this checking step may be useful. If the user does not actually pay, the download is stopped in a step 1606, after which the modal overlay 80 disappears in a step 1608. Upon confirming that a payment will be tendered, the user 20 may be redirected to a third party payment processor in a step 1610. There is a possibility that the payment attempt fails at this stage for a variety of reasons, so yet another evaluation takes place in a decision block 1620. If payment has failed, the download is stopped in the step 1606 and the modal overlay 80. If it has not failed, the modal overlay 80 disappears in a separate step 1622 and completed the download in a step 1650.

While a few of the common elements of the modal overlay 80 were considered above, there are several variations that have been configured to meet particular needs. Returning to the example shown in FIG. 13A, a more basic implementation is shown. However, within the monetization content section 90, there is additionally an optional newsfeed, social media, or interactive widget area section 94, along with a publisher branding section 96. Furthermore, there is an open to tab button 98 located on the lower right hand corner of the modal overlay 80, by which the monetized content 90 or the additional content can be loaded into a secondary tab.

The examples shown in FIGS. 13B and 13C feature a vertical download progress bar 88, which is positioned thus in order to lead the eyes of the user 20 across the monetized content in the same way that a speed reader uses the hand or other tracking device to led the eyes across the page. The download progress bar 88 can be positioned on the left side as shown in FIG. 13B, or on the right side as shown in FIG. 13C, to accommodate left-to-right reading languages and right-to-left reading languages, respectively. This variation also includes the open to tab button 98, though this can be substituted with any other button that activates various functions both within and outside of the modal overlay 80. Furthermore, instead of the publisher branding, as in the variation shown in FIGS. 13B and 13C, it is also possible to include branding for the advertiser, as shown in a branding section 100.

Figure 13D:
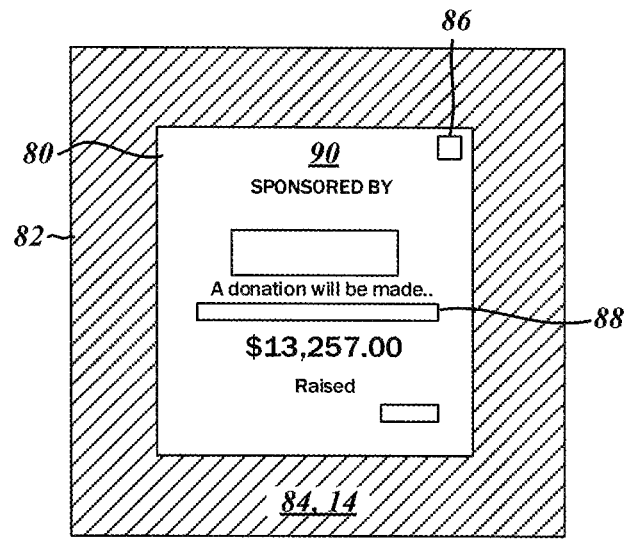
Figure 13E:
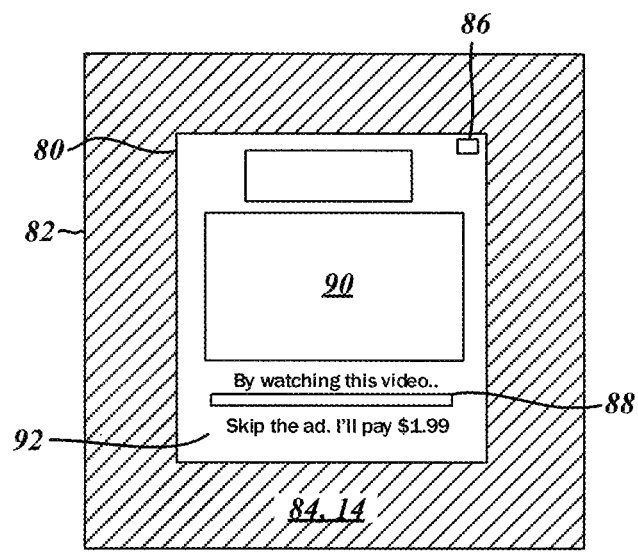

FIG. 13D illustrates an example modal overlay 80 that could find application for non-profit publisher sites 28 and custodial host sites 26. One of the differences with the other embodiments is that the total amount raised as part of fundraising through the monetized content is displayed within the modal overlay 80. In other respects, however, this variation is similar to the others discussed above.

Considering that the modal window 80, and the download progress bar 88 positioned therein, is being updated as the download progresses, changing other content displayed within is easily achieved. Depending on the length of a particular download one or more sets of monetizable content may be shown sequentially within the modal overlay. In this regard, there may also be a separate presentation once the download is complete such as a download completion graphic and so forth. Based on the foregoing disclosure, those having ordinary skill in the art will recognize the numerous possibilities for designing the modal overlay 80.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

Aspects of the present specification may also be described as follows:

1. A method for resolving custodianship of an at least one downloadable file stored on a custodial host site and referenced by a resource identifier, to which an at least one hyperlink is made available from an at least one publisher site, the method comprising the steps of: implementing an at least one database in communication with the custodial host site, the at least one database configured for storing an at least one absolute base URL associated with at least one publisher site approved for monetizing the at least one downloadable file; and upon receiving, through the custodial host site, a request for the at least one downloadable file as initiated by an at least one client device, the request including the resource identifier associated with the downloadable file and a referrer publisher identifier specifying a publisher site from which the request was generated: upon determining that the resource identifier is a relative hyperlink associated with the custodial host site, authenticating the publisher site as having custodianship over the at least one downloadable file; upon determining that the referrer publisher identifier matches an absolute base URL located in the at least one database, authenticating the publisher site as having custodianship over the at least one downloadable file; upon determining that the referrer publisher identifier matches a domain name of the resource identifier, authenticating the publisher site as having custodianship over the at least one downloadable file; and upon authenticating the publisher site as having custodianship over the at least one downloadable file, transmitting the at least one downloadable file to the at least one client device.

2. The method according to embodiment 1, further comprising the step of, upon failing to authenticate the publisher site as having custodianship over the at least one downloadable file, notifying the at least one client device that the at least one downloadable file has been improperly requested from an unauthorized publisher site.

3. The method according to embodiments 1-2, further comprising the step of, upon failing to authenticate the publisher site as having custodianship over the at least one downloadable file, redirecting the at least one client device to a page associated with the custodial host site.

4. The method according to embodiments 1-3, further comprising the steps of, upon authenticating the publisher site as having custodianship over the at least one downloadable file: generating a site authentication identifier configured for indicating that the associated publisher site has been authenticated; and storing the site authentication identifier on the associated publisher site.

5. The method according to embodiments 1-4, further comprising the step of establishing an at least one custodianship policy rule to be associated with at least one of the at least one downloadable file and the at least one publisher site, the authentication of the publisher site as having custodianship over the at least one downloadable file being contingent upon the satisfaction of the at least one custodianship policy rule.

6. The method according to embodiments 1-5, wherein the step of establishing an at least one custodianship policy rule to be associated with the at least one downloadable file further comprises the step of specifying an at least one acceptable file extension for the at least one downloadable file.

7. The method according to embodiments 1-6, further comprising the step of storing the at least one custodianship policy rule in the at least one database.

8. The method according to embodiments 1-7, wherein the step of transmitting the at least one downloadable file to the at least one client device further comprises the step of monetizing the transmission.

9. The method according to embodiments 1-8, wherein the step of monetizing the transmission further comprises the step of requiring the at least one client device to provide payment in exchange for the at least one downloadable file.

10. The method according to embodiments 1-9, wherein the step of monetizing the transmission further comprises the steps of: presenting monetized content for the at least one downloadable file; and requiring the client device to view the monetized content before access to the at least one downloadable file is allowed.

11. The method according to embodiments 1-10, wherein the step of presenting monetized content further comprises the steps of: rendering on the at least one client device a first view of a referral page received from the publisher site, the referral page including the resource identifier for the downloadable file; rendering on the at least one client device over the referral page a modal overlay; receiving a transfer instance of the at least one downloadable file from the custodial host site at a time that is one of concurrent with the rendering of the modal overlay and subsequent to the rendering of the modal overlay, data of the downloadable file being received on the client device from the custodial host site during the transfer instance; updating a download progress indicator within the modal overlay during the transfer instance; and closing the modal overlay in response to a modal overlay termination event, the modal overlay termination event being one of a user input closure activity and a monetization system-generated termination event.

12. The method according to embodiments 1-11, wherein the step of presenting monetized content further comprises the steps of: applying one or more characteristics associated with the at least one downloadable file, including one or more presentation characteristics of monetized content, within a modal overlay presentable on the client device; applying one or more characteristics associated with the one or more rules including one or more presentation characteristics of monetized content within the modal overlay presentable on the client device; customizing one or more forms of monetized content based on the identified characteristics associated with the at least one downloadable file and on the identified characteristics associated with the one or more rules by customizing a presentation of monetized content based on the one or more identified presentation characteristics of the content within the modal overlay; and transmitting the customized monetized content for display in the modal overlay.

13. The method according to embodiments 1-12, wherein the step of identifying one or more characteristics associated with the at least one downloadable file further comprises the step of identifying subject matter and user interest graph characteristics associated with the downloadable file.

14. The method according to embodiments 1-13, further comprising the steps of: identifying visual characteristics and rules associated with branding specifications for the publisher site; and displaying branding related to the publisher within the modal overlay.

15. The method according to embodiments 1-14, wherein the step of identifying one or more characteristics associated with the at least one downloadable file further comprises the step of applying a matching function to an area used for displaying content within the modal overlay to determine one or more characteristics associated with the area if the content were a block of text.

16. The method according to embodiments 1-15, wherein the step of identifying one or more characteristics associated with the at least one downloadable file further comprises the steps of: analyzing a document object model (DOM) element associated with a referral page; identifying an at least one node associated with the downloadable file from the document object model element; and determining one or more characteristics associated with the at least one identified node.

17. The method according to embodiments 1-16, wherein the step of determining one or more characteristics associated with the at least one identified node further comprises the steps of: weighting the at least one identified node based on a predetermined criteria associated with each said node; identifying a one of the at least one identified node with a highest weight; and determining one or more characteristics associated with the identified node with the highest weight.

18. The method according to embodiments 1-17, wherein the step of weighting the at least one identified node based on a predetermined criteria associated with each said node further comprises the step of weighting the at least one identified node based on the publisher rules associated with said node.

19. The method according to embodiments 1-18, wherein the step of weighting the at least one identified node based on the predetermined criteria associated with each said node further comprises the step of weighting the at least one identified node based on at least one of interest graph tags and metadata covered by each said node.

20. The method according to embodiments 1-19, wherein the step of weighting the at least one identified node based on the predetermined criteria associated with each said node further comprises the step of determining the customized monetized content to be displayed in the modal overlay based on said weighting.

21. The method according to embodiments 1-20, wherein the step of identifying one or more characteristics associated with the rules further comprises the step of identifying a color scheme associated with publisher site for use in the modal overlay.

22. A method for resolving custodianship of an at least one downloadable file stored on a custodial host site and referenced by a resource identifier, to which an at least one hyperlink is made available from an at least one publisher site, the method comprising the steps of: implementing an at least one database in communication with the custodial host site, the at least one database configured for storing an at least one absolute base URL associated with at least one publisher site approved for monetizing the at least one downloadable file; and upon receiving, through the custodial host site, a request for the at least one downloadable file as initiated by an at least one client device, the request including the resource identifier associated with the downloadable file and a referrer publisher identifier specifying a publisher site from which the request was generated: upon determining that the resource identifier is a relative hyperlink associated with the custodial host site, authenticating the publisher site as having custodianship over the at least one downloadable file; upon determining that the referrer publisher identifier matches an absolute base URL located in the at least one database, authenticating the publisher site as having custodianship over the at least one downloadable file; upon determining that the referrer publisher identifier matches a domain name of the resource identifier, authenticating the publisher site as having custodianship over the at least one downloadable file; and upon authenticating the publisher site as having custodianship over the at least one downloadable file: transmitting the at least one downloadable file to the at least one client device presenting monetized content for the at least one downloadable file; and requiring the client device to view the monetized content before access to the at least one downloadable file is allowed.

23. A system for resolving custodianship of an at least one downloadable file referenced by a resource identifier, to which an at least one hyperlink is made available from an at least one publisher site, the system comprising: an at least one custodial host site configured for storing the at least one downloadable file; and an at least one database in communication with the custodial host site, the at least one database configured for storing an at least one absolute base URL associated with at least one publisher site approved for monetizing the at least one downloadable file; wherein, upon the custodial host site receiving a request for the at least one downloadable file as initiated by an at least one client device, the request including the resource identifier associated with the downloadable file and a referrer publisher identifier specifying a publisher site from which the request was generated, the system is configured for: upon determining that the resource identifier is a relative hyperlink associated with the custodial host site, authenticating the publisher site as having custodianship over the at least one downloadable file; upon determining that the referrer publisher identifier matches an absolute base URL located in the at least one database, authenticating the publisher site as having custodianship over the at least one downloadable file; upon determining that the referrer publisher identifier matches a domain name of the resource identifier, authenticating the publisher site as having custodianship over the at least one downloadable file; and upon authenticating the publisher site as having custodianship over the at least one downloadable file, transmitting the at least one downloadable file to the at least one client device.

24. The system according to embodiment 23, wherein, upon failing to authenticate the publisher site as having custodianship over the at least one downloadable file, the system is further configured for notifying the at least one client device that the at least one downloadable file has been improperly requested from an authorized publisher site.

25. The system according to embodiments 23-24, wherein, upon failing to authenticate the publisher site as having custodianship over the at least one downloadable file, the system is further configured for redirecting the at least one client device to a page associated with the custodial host site.

26. The system according to embodiments 23-25, wherein, upon authenticating the publisher site as having custodianship over the at least one downloadable file, the system is further configured for: generating a site authentication identifier configured for indicating that the associated publisher site has been authenticated; and storing the site authentication identifier on the associated publisher site.

27. The system according to embodiments 23-26, wherein the system is further configured for establishing an at least one custodianship policy rule to be associated with at least one of the at least one downloadable file and the at least one publisher site, the authentication of the publisher site as having custodianship over the at least one downloadable file being contingent upon the satisfaction of the at least one custodianship policy rule.

28. The system according to embodiments 23-27, wherein while establishing an at least one custodianship policy rule to be associated with the at least one downloadable file, the system is further configured for specifying an at least one acceptable file extension for the at least one downloadable file.

29. The system according to embodiments 23-28, wherein the system is further configured for storing the at least one custodianship policy rule in the at least one database.

30. The system according to embodiments 23-29, wherein while transmitting the at least one downloadable file to the at least one client device, the system is further configured for monetizing the transmission.

31. The system according to embodiments 23-30, wherein while monetizing the transmission, the system is further configured for requiring the at least one client device to provide payment in exchange for the at least one downloadable file.

32. The system according to embodiments 23-31, wherein while monetizing the transmission, the system is further configured for: presenting monetized content for the at least one downloadable file; and requiring the client device to view the monetized content before access to the at least one downloadable file is allowed.

33. The system according to embodiments 23-32, wherein while presenting monetized content, the system is further configured for: rendering on the at least one client device a first view of a referral page received from the publisher site, the referral page including the resource identifier for the downloadable file; rendering on the at least one client device over the referral page a modal overlay; receiving a transfer instance of the at least one downloadable file from the custodial host site at a time that is one of concurrent with the rendering of the modal overlay and subsequent to the rendering of the modal overlay, data of the downloadable file being received on the client device from the custodial host site during the transfer instance; updating a download progress indicator within the modal overlay during the transfer instance; and closing the modal overlay in response to a modal overlay termination event, the modal overlay termination event being one of a user input closure activity and a monetization system-generated termination event.

34. The system according to embodiments 23-33, wherein while presenting monetized content, the system is further configured for: applying one or more characteristics associated with the at least one downloadable file, including one or more presentation characteristics of monetized content, within a modal overlay presentable on the client device; applying one or more characteristics associated with the one or more rules including one or more presentation characteristics of monetized content within the modal overlay presentable on the client device; customizing one or more forms of monetized content based on the identified characteristics associated with the at least one downloadable file and on the identified characteristics associated with the one or more rules by customizing a presentation of monetized content based on the one or more identified presentation characteristics of the content within the modal overlay; and transmitting the customized monetized content for display in the modal overlay.

35. The system according to embodiments 23-34, wherein while identifying one or more characteristics associated with the at least one downloadable file, the system is further configured for identifying subject matter and user interest graph characteristics associated with the downloadable file.

36. The system according to embodiments 23-35, wherein the system is further configured for: identifying visual characteristics and rules associated with branding specifications for the publisher site; and displaying branding related to the publisher within the modal overlay.

37. The system according to embodiments 23-36, wherein while identifying one or more characteristics associated with the at least one downloadable file, the system is further configured for applying a matching function to an area used for displaying content within the modal overlay to determine one or more characteristics associated with the area if the content were a block of text.

38. The system according to embodiments 23-37, wherein while identifying one or more characteristics associated with the at least one downloadable file, the system is further configured for: analyzing a document object model (DOM) element associated with a referral page; identifying an at least one node associated with the downloadable file from the document object model element; and determining one or more characteristics associated with the at least one identified node.

39. The system according to embodiments 23-38, wherein while determining one or more characteristics associated with the at least one identified node, the system is further configured for: weighting the at least one identified node based on a predetermined criteria associated with each said node; identifying a one of the at least one identified node with a highest weight; and determining one or more characteristics associated with the identified node with the highest weight.

40. The system according to embodiments 23-39, wherein while weighting the at least one identified node based on a predetermined criteria associated with each said node, the system is further configured for weighting the at least one identified node based on the publisher rules associated with said node.

41. The system according to embodiments 23-40, wherein while weighting the at least one identified node based on the predetermined criteria associated with each said node, the system is further configured for weighting the at least one identified node based on at least one of interest graph tags and metadata covered by each said node.

42. The system according to embodiments 23-41, wherein while weighting the at least one identified node based on the predetermined criteria associated with each said node, the system is further configured for determining the customized monetized content to be displayed in the modal overlay based on said weighting.

43. The system according to embodiments 23-42, wherein while identifying one or more characteristics associated with the rules, the system is further configured for identifying a color scheme associated with publisher site for use in the modal overlay.

In closing, regarding the exemplary embodiments of the present invention as shown and described herein, it will be appreciated that a system and associated methods are disclosed and configured for monetizing downloadable files based on resolving custodianship thereof to a referring publisher, and presenting monetized content in a modal overlay contemporaneously with the download. Because the principles of the invention may be practiced in a number of configurations beyond those shown and described, it is to be understood that the invention is not in any way limited by the exemplary embodiments, but is generally directed to such a system and associated methods and is able to take numerous forms to do so without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for resolving custodianship of an at least one downloadable file stored on a custodial host site, residing on an at least one server computer system, and referenced by a resource identifier, to which an at least one hyperlink is made available from an at least one publisher site, the method comprising the steps of:

implementing an at least one database in communication with the custodial host site, the at least one database configured for storing an at least one absolute base URL associated with at least one publisher site approved for monetizing the at least one downloadable file; and the at least one server computer system receiving, through the custodial host site, a request for the at least one downloadable file as initiated by an at least one client device, the request including the resource identifier associated with the downloadable file and a referrer publisher identifier specifying a publisher site from which the request was generated:

the at least one server computer system determining that the resource identifier is a relative hyperlink associated with the custodial host site, authenticating the publisher site as having custodianship over the at least one downloadable file;

the at least one server computer system determining that the referrer publisher identifier matches an absolute base URL located in the at least one database, authenticating the publisher site as having custodianship over the at least one downloadable file;

the at least one server computer system determining that the referrer publisher identifier matches a domain name of the resource identifier, authenticating the publisher site as having custodianship over the at least one downloadable file; and the at least one server computer system authenticating the publisher site as having custodianship over the at least one downloadable file, transmitting the at least one downloadable file to the at least one client device.

2. The method of claim 1, further comprising the step of, upon failing to authenticate the publisher site as having custodianship over the at least one downloadable file, notifying the at least one client device that the at least one downloadable file has been improperly requested from an unauthorized publisher site.

3. The method of claim 1, further comprising the step of, upon failing to authenticate the publisher site as having custodianship over the at least one downloadable file, redirecting the at least one client device to a page associated with the custodial host site.

4. The method of claim 1, further comprising the steps of, upon authenticating the publisher site as having custodianship over the at least one downloadable file:

generating a site authentication identifier configured for indicating that the associated publisher site has been authenticated; and storing the site authentication identifier on the associated publisher site.

5. The method of claim 1, further comprising the step of establishing an at least one custodianship policy rule to be associated with at least one of the at least one downloadable file and the at least one publisher site, the authentication of the publisher site as having custodianship over the at least one downloadable file being contingent upon the satisfaction of the at least one custodianship policy rule.

6. The method of claim 5, wherein the step of establishing an at least one custodianship policy rule to be associated with the at least one downloadable file further comprises the step of specifying an at least one acceptable file extension for the at least one downloadable file.

7. The method of claim 1, wherein the step of transmitting the at least one downloadable file to the at least one client device further comprises the step of monetizing the transmission.

8. The method of claim 7, wherein the step of monetizing the transmission further comprises the step of requiring the at least one client device to provide payment in exchange for the at least one downloadable file.

9. The method of claim 7, wherein the step of monetizing the transmission further comprises the steps of:

presenting monetized content for the at least one downloadable file; and requiring the client device to view the monetized content before access to the at least one downloadable file is allowed.

10. The method of claim 9, wherein the step of presenting monetized content further comprises the steps of:

rendering on the at least one client device a first view of a referral page received from the publisher site, the referral page including the resource identifier for the downloadable file;

rendering on the at least one client device over the referral page a modal overlay;

receiving a transfer instance of the at least one downloadable file from the custodial host site at a time that is one of concurrent with the rendering of the modal overlay and subsequent to the rendering of the modal overlay, data of the downloadable file being received on the client device from the custodial host site during the transfer instance;

updating a download progress indicator within the modal overlay during the transfer instance; and closing the modal overlay in response to a modal overlay termination event, the modal overlay termination event being one of a user input closure activity and a monetization system-generated termination event.

11. The method of claim 9, wherein the step of presenting monetized content further comprises the steps of:

applying one or more characteristics associated with the at least one downloadable file, including one or more presentation characteristics of monetized content, within a modal overlay presentable on the client device;

applying one or more characteristics associated with the one or more rules including one or more presentation characteristics of monetized content within the modal overlay presentable on the client device;

customizing one or more forms of monetized content based on the identified characteristics associated with the at least one downloadable file and on the identified characteristics associated with the one or more rules by customizing a presentation of monetized content based on the one or more identified presentation characteristics of the content within the modal overlay; and transmitting the customized monetized content for display in the modal overlay.

12. The method of claim 11, further comprising the steps of:

identifying visual characteristics and rules associated with branding specifications for the publisher site; and displaying branding related to the publisher within the modal overlay.

13. The method of claim 11, wherein the step of identifying one or more characteristics associated with the at least one downloadable file further comprises the step of applying a matching function to an area used for displaying content within the modal overlay to determine one or more characteristics associated with the area if the content were a block of text.

14. The method of claim 11, wherein the step of identifying one or more characteristics associated with the at least one downloadable file further comprises the steps of:

analyzing a document object model (DOM) element associated with a referral page;

identifying an at least one node associated with the downloadable file from the document object model element; and determining one or more characteristics associated with the at least one identified node.

15. The method of claim 14, wherein the step of determining one or more characteristics associated with the at least one identified node further comprises the steps of:

weighting the at least one identified node based on a predetermined criteria associated with each said node;

identifying a one of the at least one identified node with a highest weight; and determining one or more characteristics associated with the identified node with the highest weight.

16. The method of claim 15, wherein the step of weighting the at least one identified node based on a predetermined criteria associated with each said node further comprises the step of weighting the at least one identified node based on the publisher rules associated with said node.

17. The method of claim 16, wherein the step of weighting the at least one identified node based on the predetermined criteria associated with each said node further comprises the step of weighting the at least one identified node based on at least one of interest graph tags and metadata covered by each said node.

18. The method of claim 16, wherein the step of weighting the at least one identified node based on the predetermined criteria associated with each said node further comprises the step of determining the customized monetized content to be displayed in the modal overlay based on said weighting.

19. A method for resolving custodianship of an at least one downloadable file stored on a custodial host site, residing on an at least one server computer system, and referenced by a resource identifier, to which an at least one hyperlink is made available from an at least one publisher site, the method comprising the steps of:

implementing an at least one database in communication with the custodial host site, the at least one database configured for storing an at least one absolute base URL associated with at least one publisher site approved for monetizing the at least one downloadable file; and the at least one server computer system receiving, through the custodial host site, a request for the at least one downloadable file as initiated by an at least one client device, the request including the resource identifier associated with the downloadable file and a referrer publisher identifier specifying a publisher site from which the request was generated:

the at least one server computer system determining that the resource identifier is a relative hyperlink associated with the custodial host site, authenticating the publisher site as having custodianship over the at least one downloadable file;

the at least one server computer system determining that the referrer publisher identifier matches an absolute base URL located in the at least one database, authenticating the publisher site as having custodianship over the at least one downloadable file;

the at least one server computer system determining that the referrer publisher identifier matches a domain name of the resource identifier, authenticating the publisher site as having custodianship over the at least one downloadable file; and the at least one server computer system authenticating the publisher site as having custodianship over the at least one downloadable file: transmitting the at least one downloadable file to the at least one client device;

presenting monetized content for the at least one downloadable file; and requiring the client device to view the monetized content before access to the at least one downloadable file is allowed.

20. A system for resolving custodianship of an at least one downloadable file referenced by a resource identifier, to which an at least one hyperlink is made available from an at least one publisher site, the system comprising:

an at least one custodial host site, residing on an at least one server computer system, configured for storing the at least one downloadable file; and an at least one database in communication with the custodial host site, the at least one database configured for storing an at least one absolute base URL associated with at least one publisher site approved for monetizing the at least one downloadable file;

wherein, the custodial host site receiving a request for the at least one downloadable file as initiated by an at least one client device, the request including the resource identifier associated with the downloadable file and a referrer publisher identifier specifying a publisher site from which the request was generated, the system at least one server computer system is configured for:

determining that the resource identifier is a relative hyperlink associated with the custodial host site, authenticating the publisher site as having custodianship over the at least one downloadable file;

determining that the referrer publisher identifier matches an absolute base URL located in the at least one database, authenticating the publisher site as having custodianship over the at least one downloadable file;

determining that the referrer publisher identifier matches a domain name of the resource identifier, authenticating the publisher site as having custodianship over the at least one downloadable file; and authenticating the publisher site as having custodianship over the at least one downloadable file, transmitting the at least one downloadable file to the at least one client device.

* * * * *